United States Patent [19]

Blom

[11] Patent Number: 4,609,266

[45] Date of Patent: Sep. 2, 1986

[54] ELIMINATION OF INTERNAL REFLECTIONS AND DIFFRACTIONS FROM JUNCTURES IN AND AT THE PERIPHERY OF, A SEGMENTED MIRROR

[75] Inventor: C. James Blom, Bakersfield, Calif.

[73] Assignee: Roxor Corporation, Bakersfield, Calif.

[21] Appl. No.: 642,179

[22] Filed: Aug. 20, 1984

Related U.S. Application Data

[60] Continuation-in-part of Ser. No. 385,544, Jun. 7, 1982, Pat. No. 4,470,665, which is a division of Ser. No. 233,106, Feb. 10, 1981, Pat. No. 4,368,951.

[51] Int. Cl.⁴ ............................................. G02B 5/08
[52] U.S. Cl. ............................ 350/613; 350/276 SL; 350/320; 427/164; 427/166; 427/14.1; 427/250; 427/266
[58] Field of Search .................. 350/612, 613, 276 R, 350/276 SL, 277, 452, 417, 320; 264/2.5, 1.4; 427/164–168, 14.1, 27, 249, 250, 255.7, 265, 266

[56] References Cited

U.S. PATENT DOCUMENTS

| | | | |
|---|---|---|---|
| 2,312,206 | 2/1943 | Calbick | 350/276 SL |
| 3,039,349 | 6/1962 | Rodgers | 350/276 SL |
| 3,708,222 | 1/1973 | Stern | 350/613 |
| 3,784,282 | 1/1974 | Yamazaki et al. | 350/452 |
| 3,806,232 | 4/1974 | Gray | 350/613 |
| 3,806,233 | 4/1974 | Stefano | 350/613 |
| 3,908,056 | 9/1975 | Anderson | 350/613 |
| 4,108,540 | 8/1978 | Anderson et al. | 350/452 |

FOREIGN PATENT DOCUMENTS

| | | | |
|---|---|---|---|
| 2550095 | 5/1976 | Fed. Rep. of Germany | 350/613 |
| 161503 | 12/1981 | Japan | 350/613 |

Primary Examiner—Jon W. Henry
Attorney, Agent, or Firm—William W. Haefliger

[57] ABSTRACT

In a transparent molded segmented mirror having individual sectors on a transparent molding and comprising a myriad of reflecting surfaces at the rear side of the mirror away from the viewer, said surfaces located to produce, in the eyes of the viewer, a virtual image, or separate virtual images from separate portions of such molded mirror, there being zones separating the reflecting surfaces, the improvement comprising:

(a) a material coating said zones and which includes a light absorber,
(b) such material having approximately, the same index of refraction as the transparent molding,
(c) whereby undesirable reflections from said zone are substantially reduced, because light impinging thereon cannot be reflected, but is only absorbed.

Also, the thickness of light reflecting metallizing material defining the reflective surfaces may be thinned adjacent said zones, and the light absorptive coating may be applied over the thinned metallizing material; and the edges of the molding and of a glass backer may be coated with light absorptives material.

23 Claims, 60 Drawing Figures

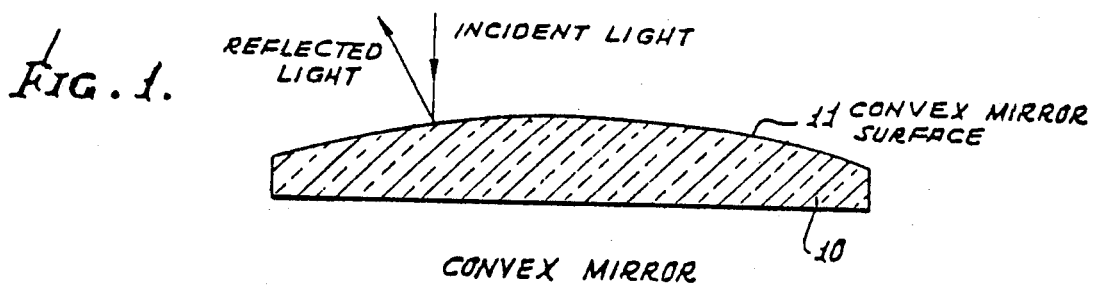
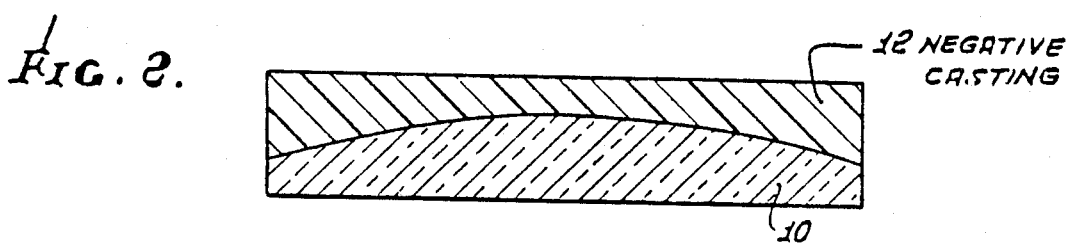
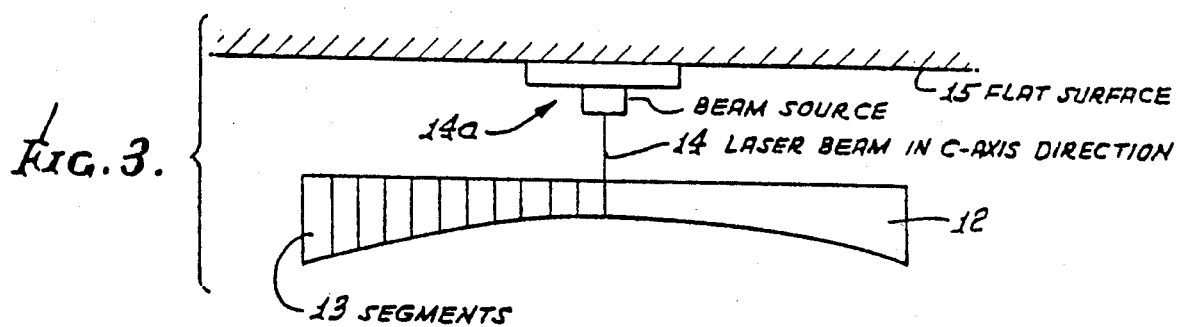
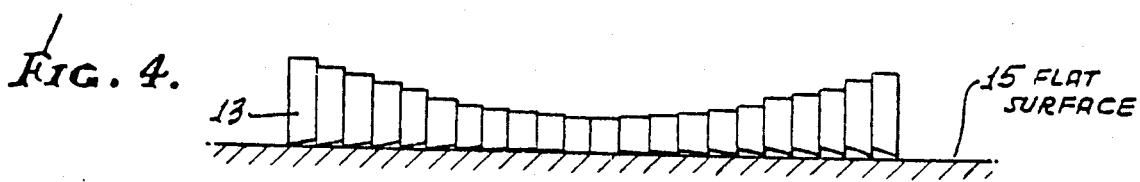
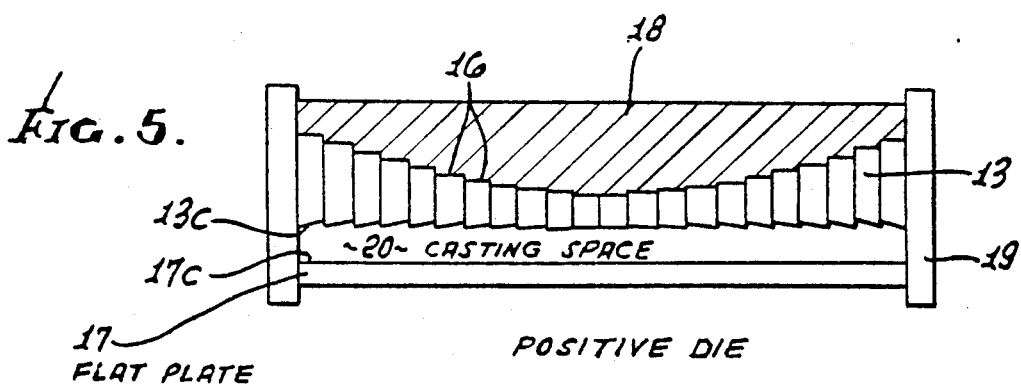

POSITIVE CASTING

NEGATIVE DIE

NEGATIVE CASTING

SEGMENTED MIRROR

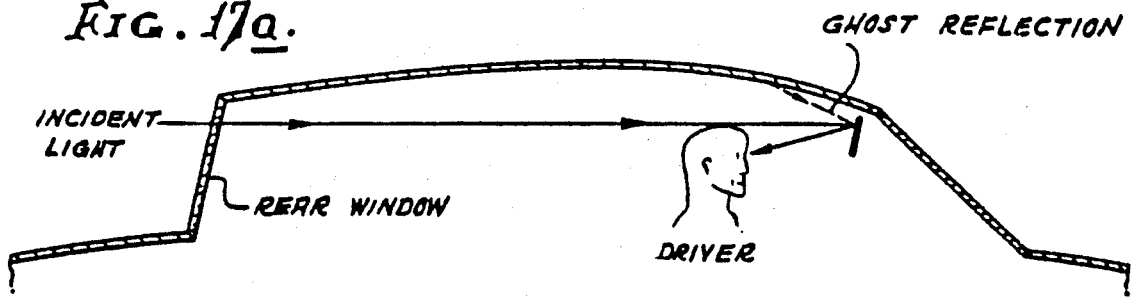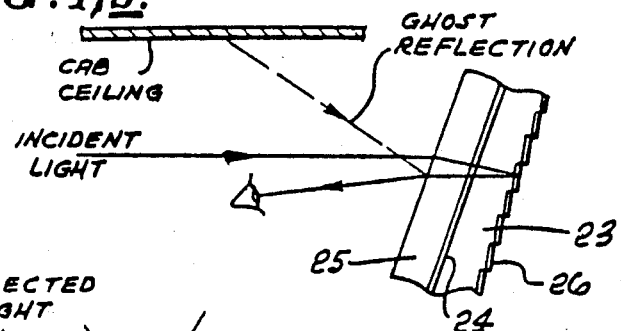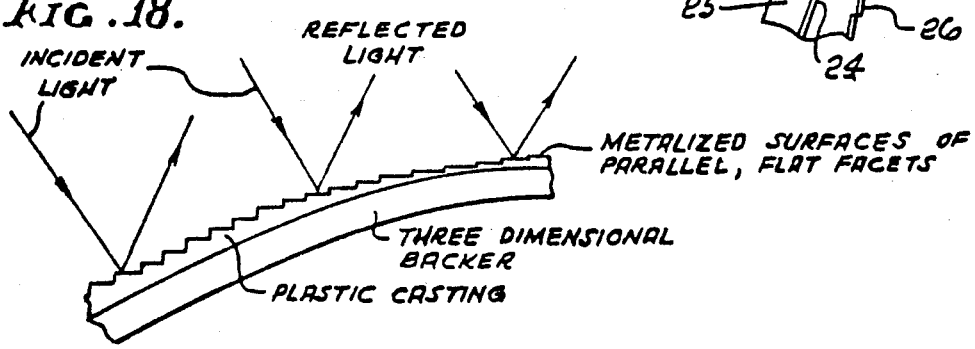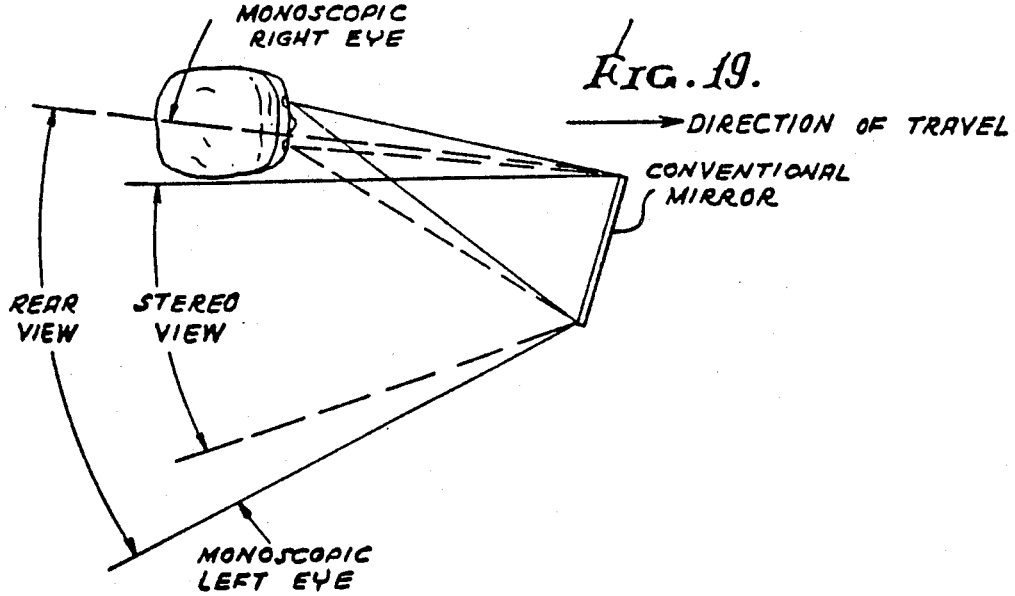

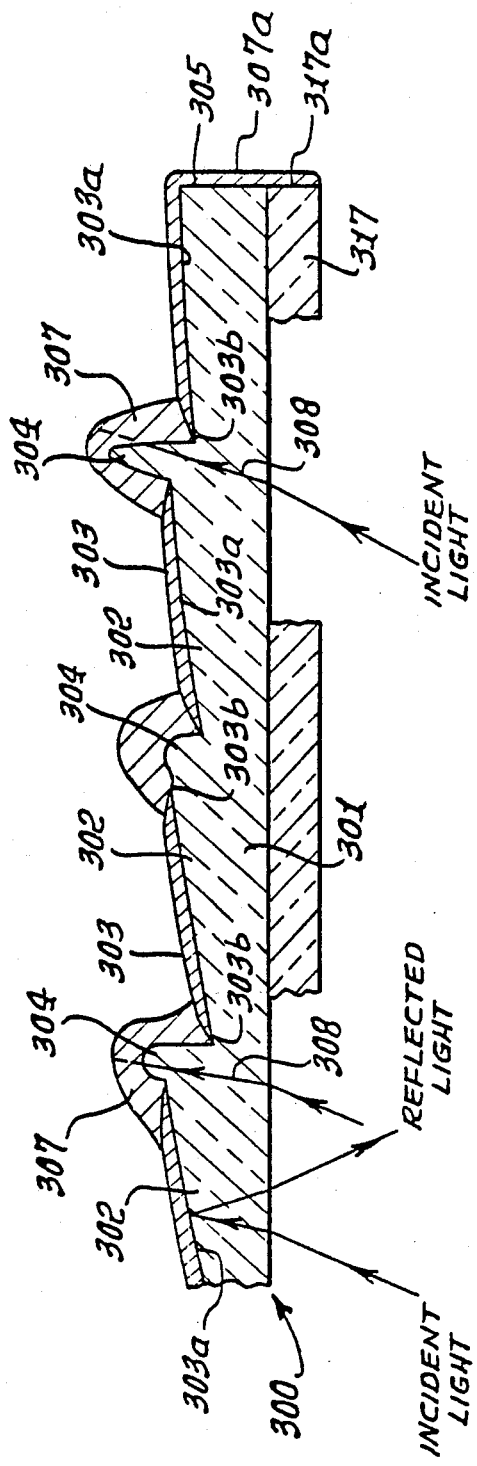
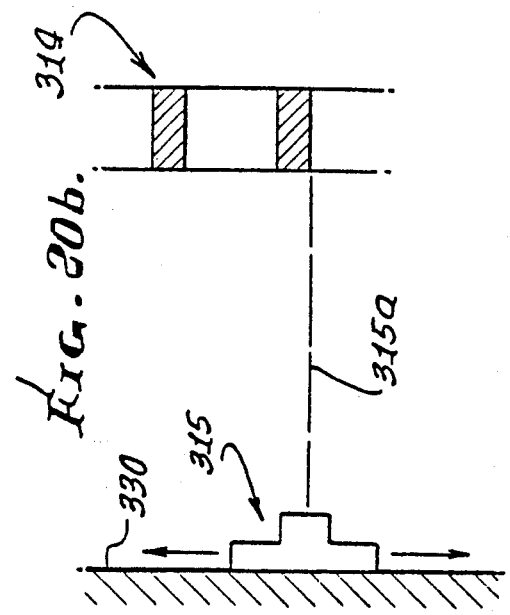
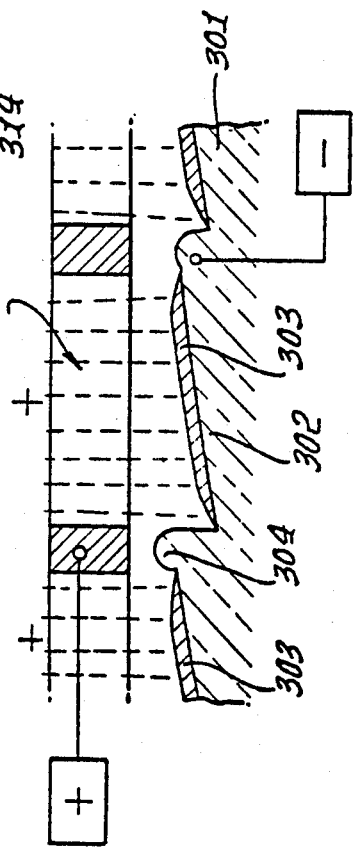

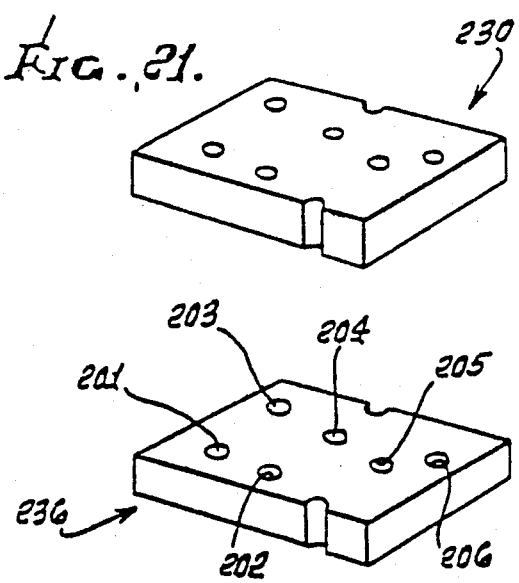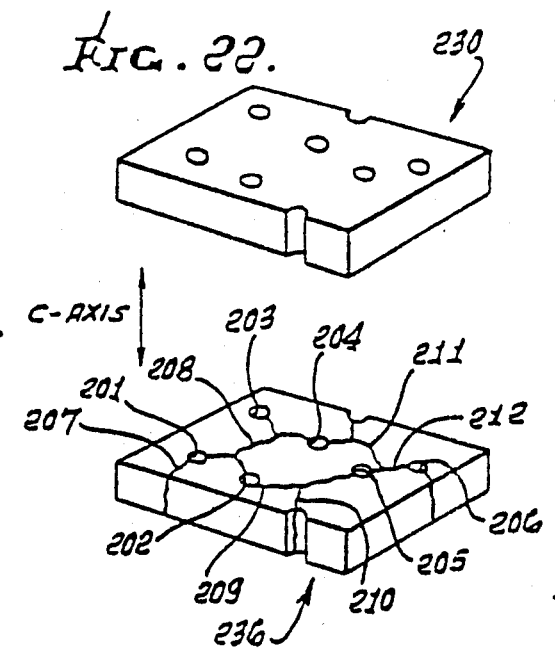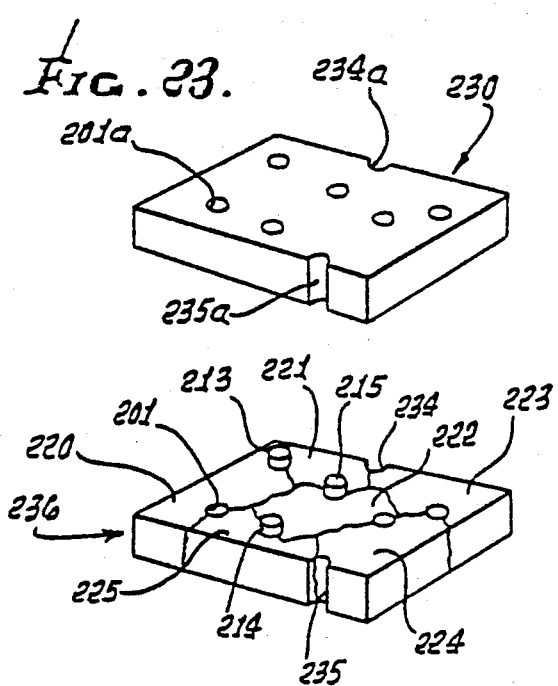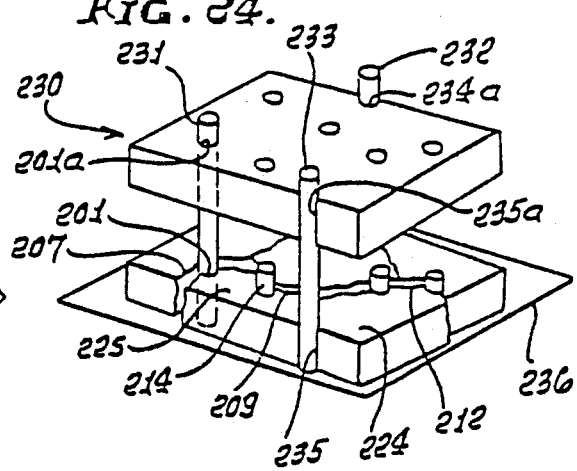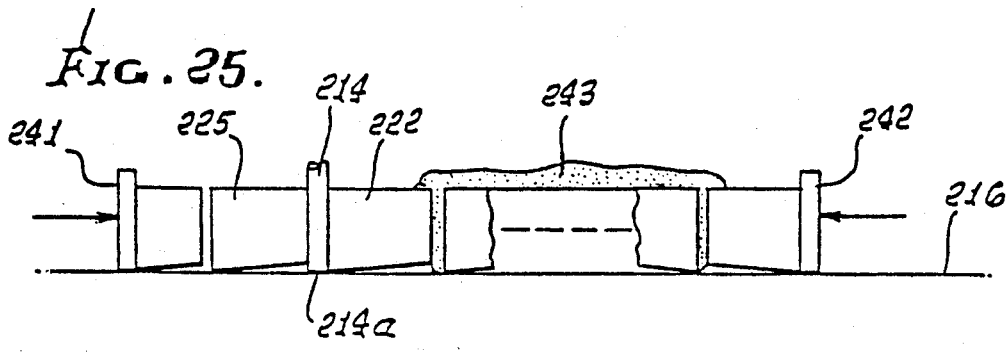

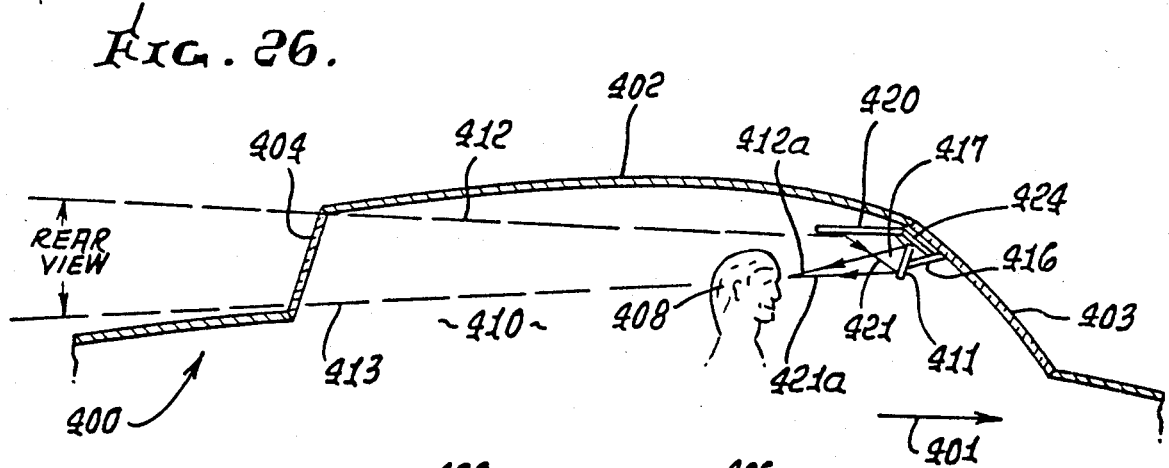
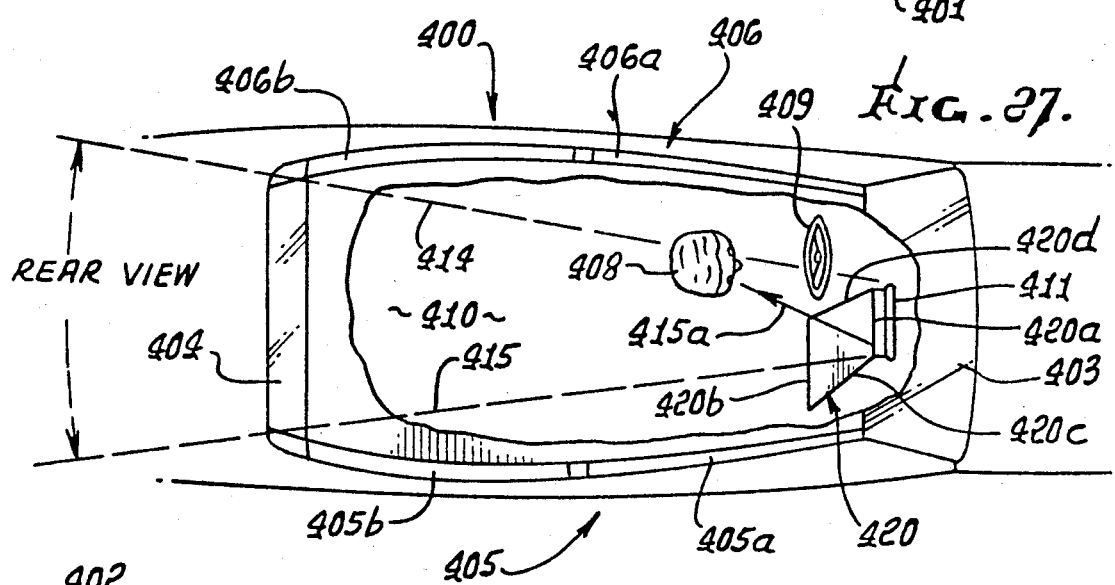
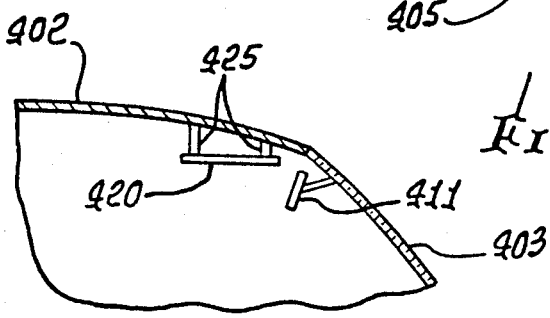
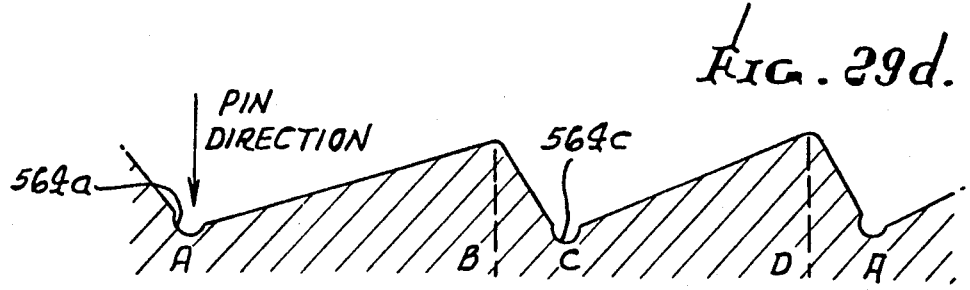

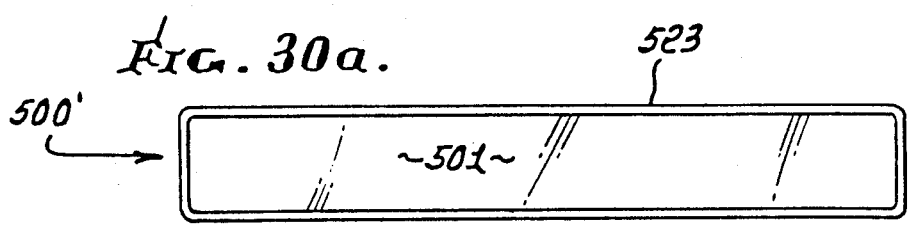
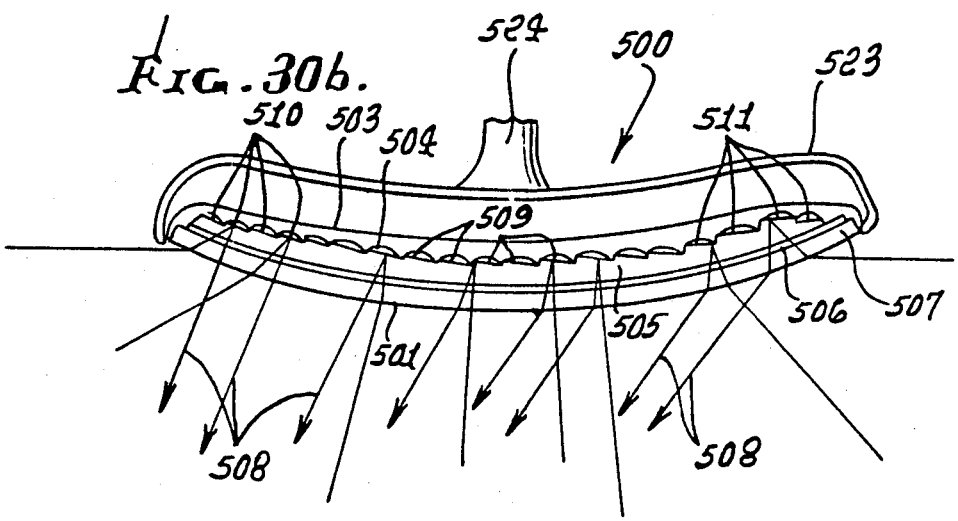
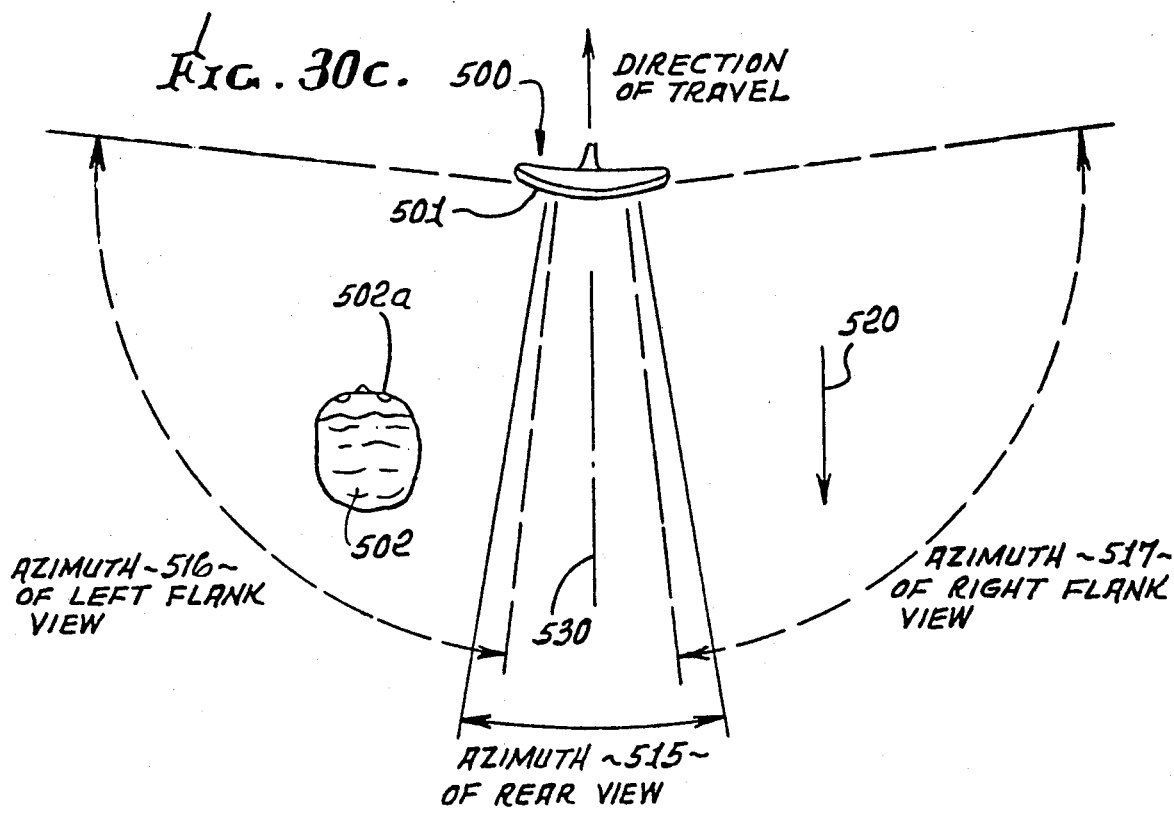

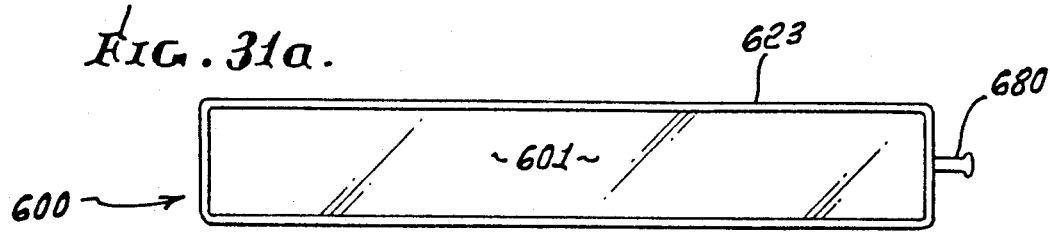
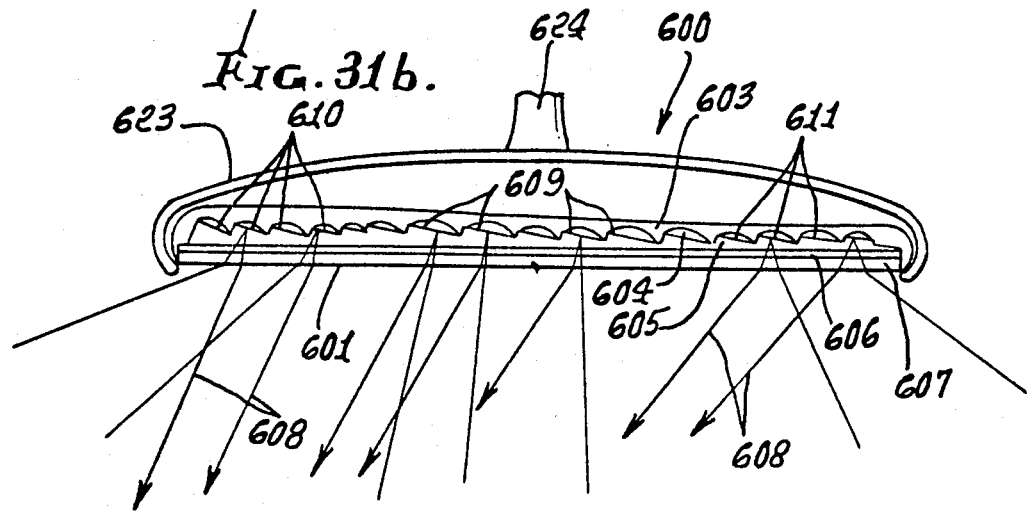
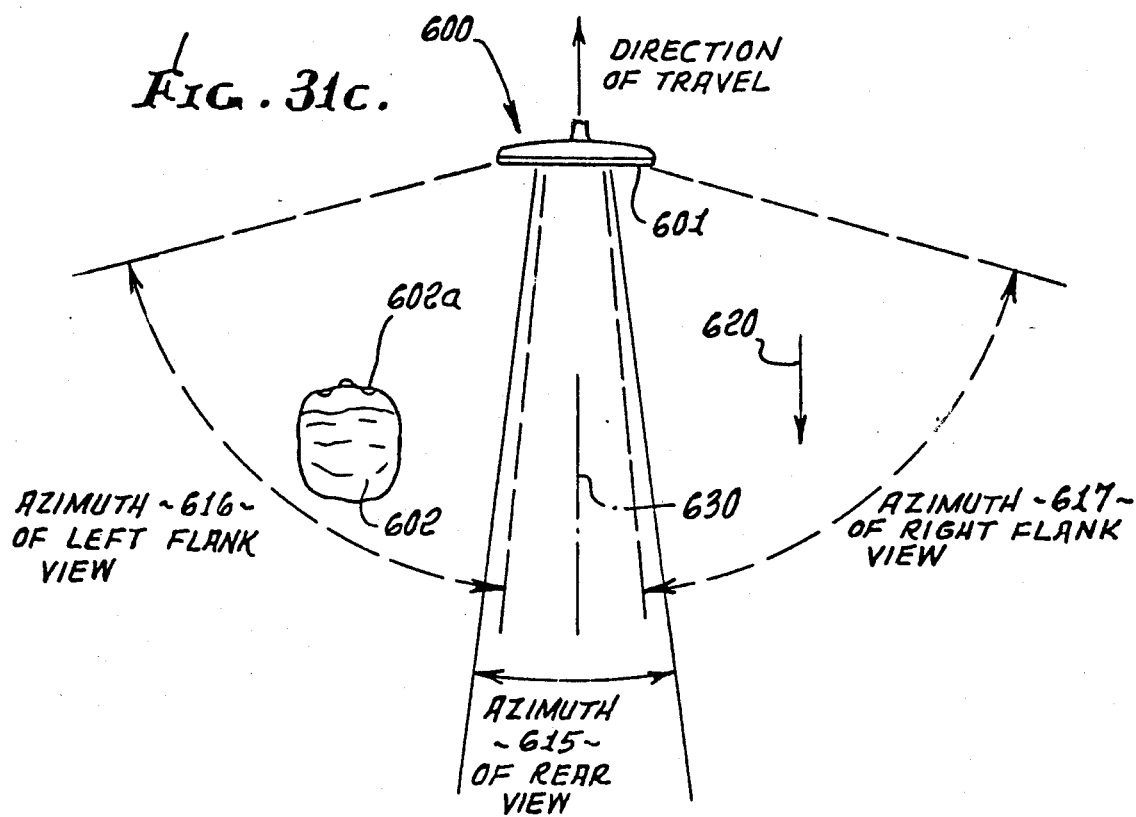

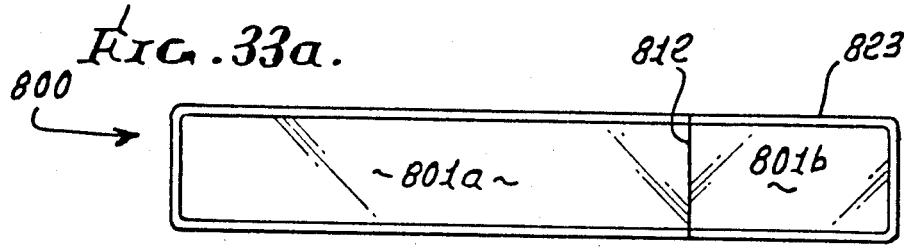
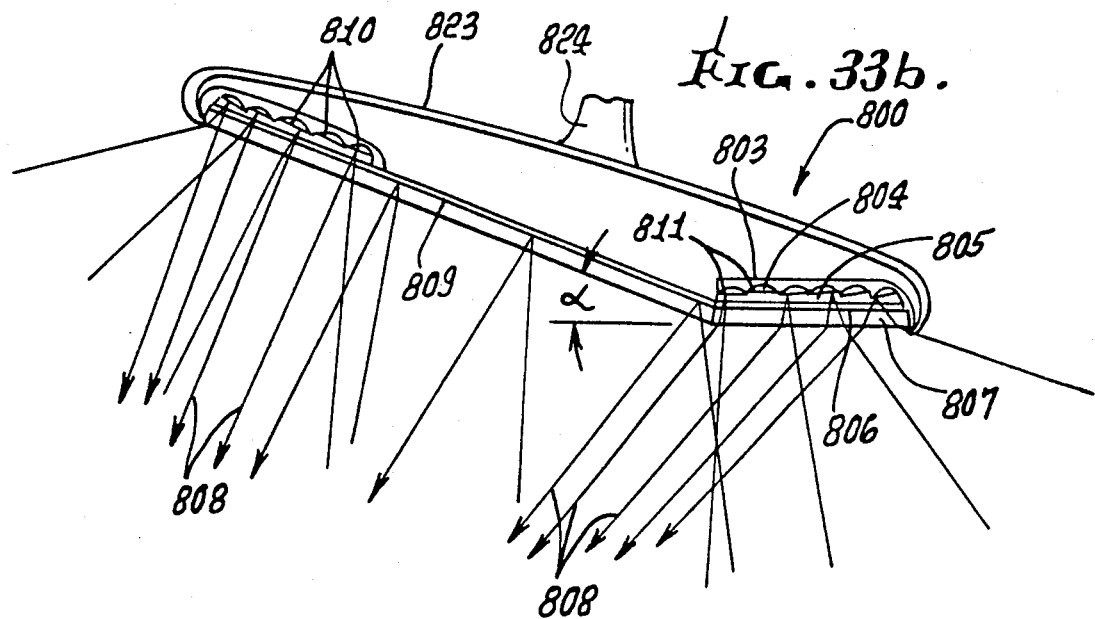
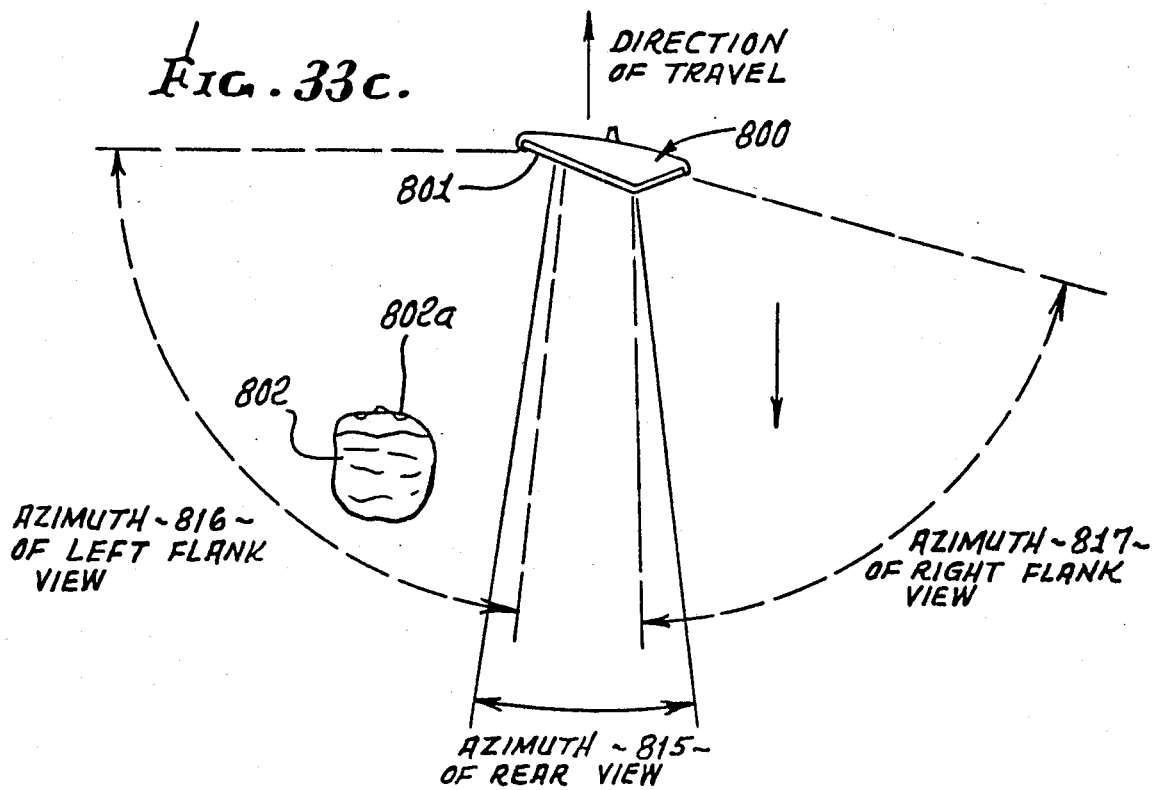

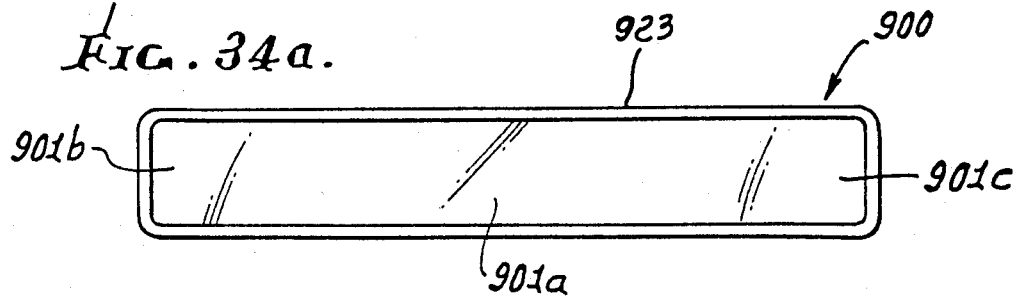
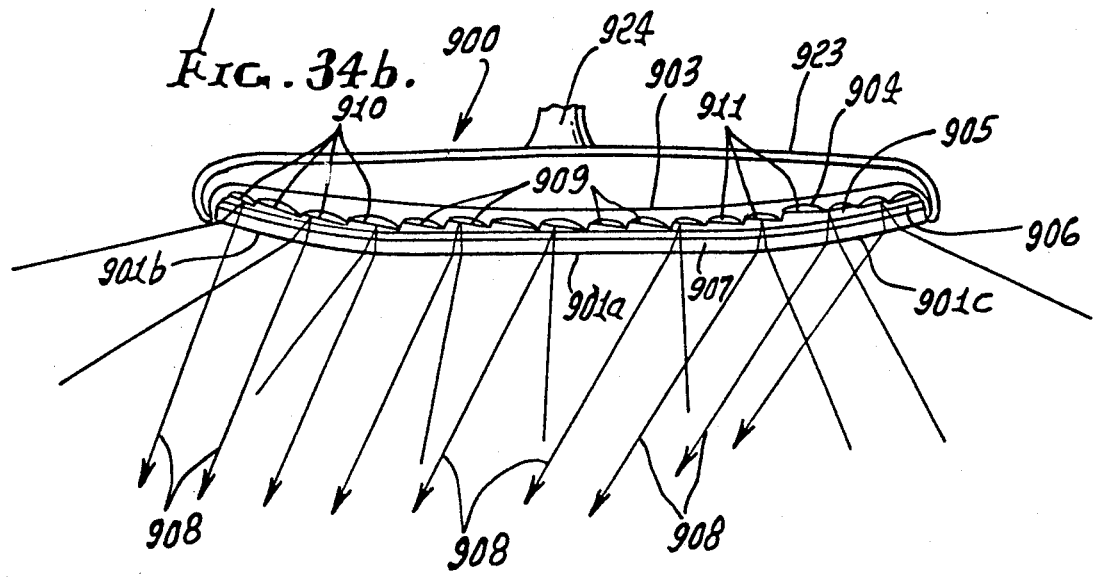
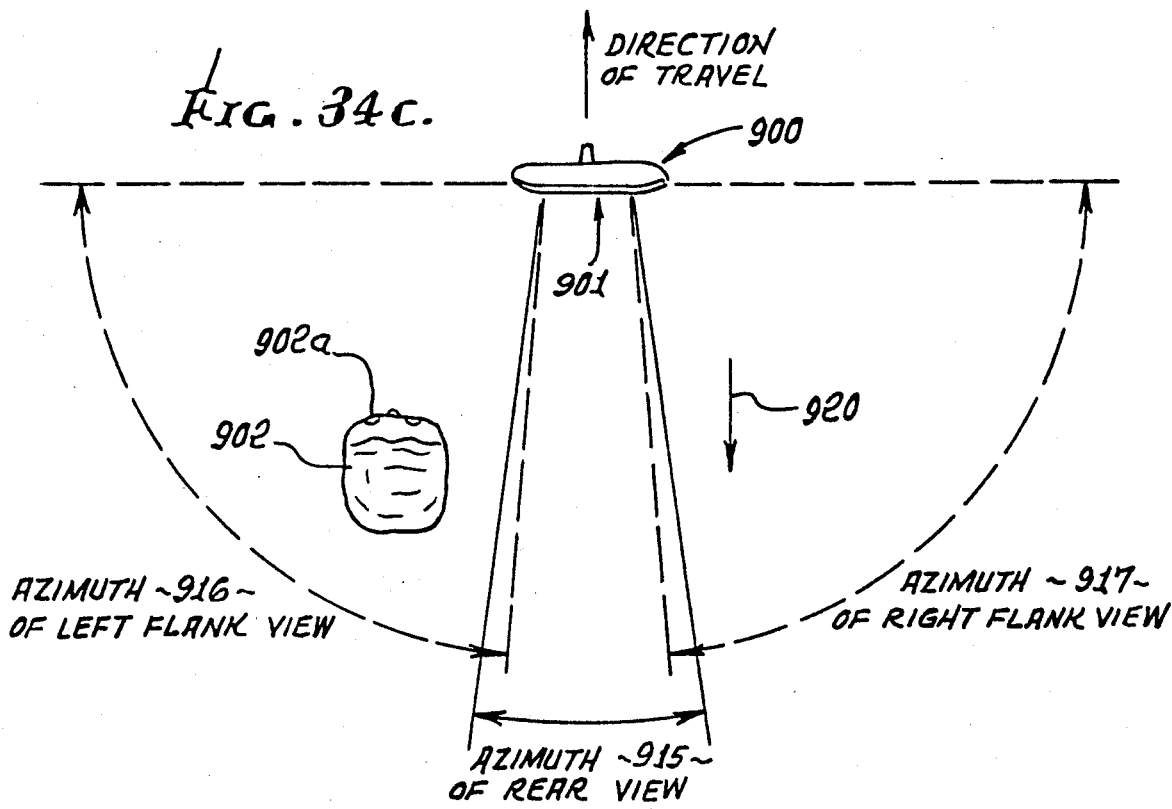

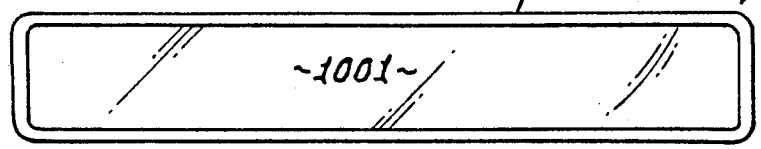
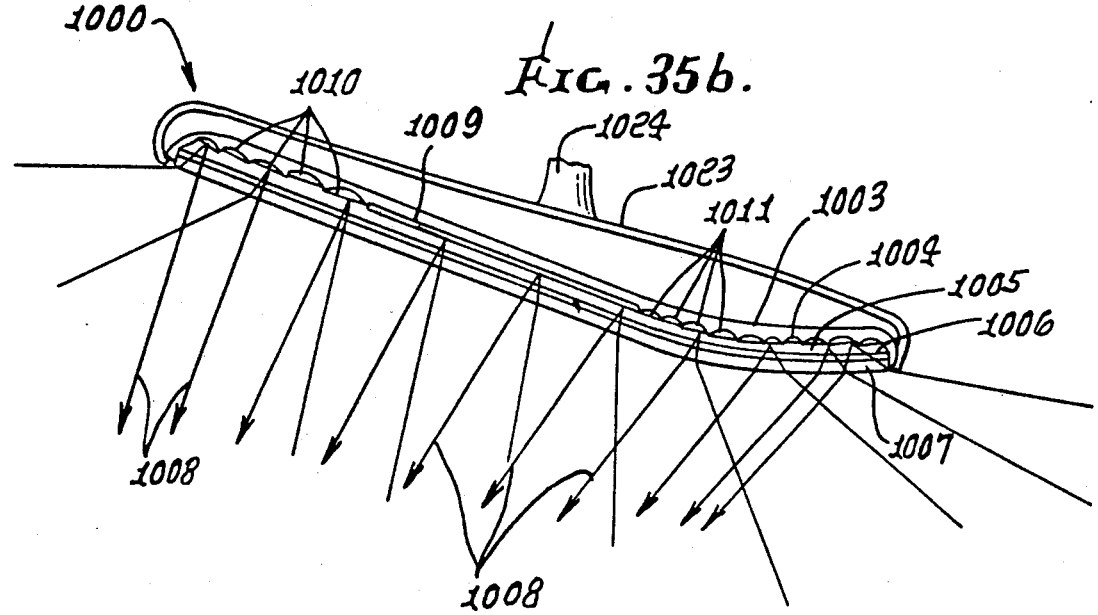
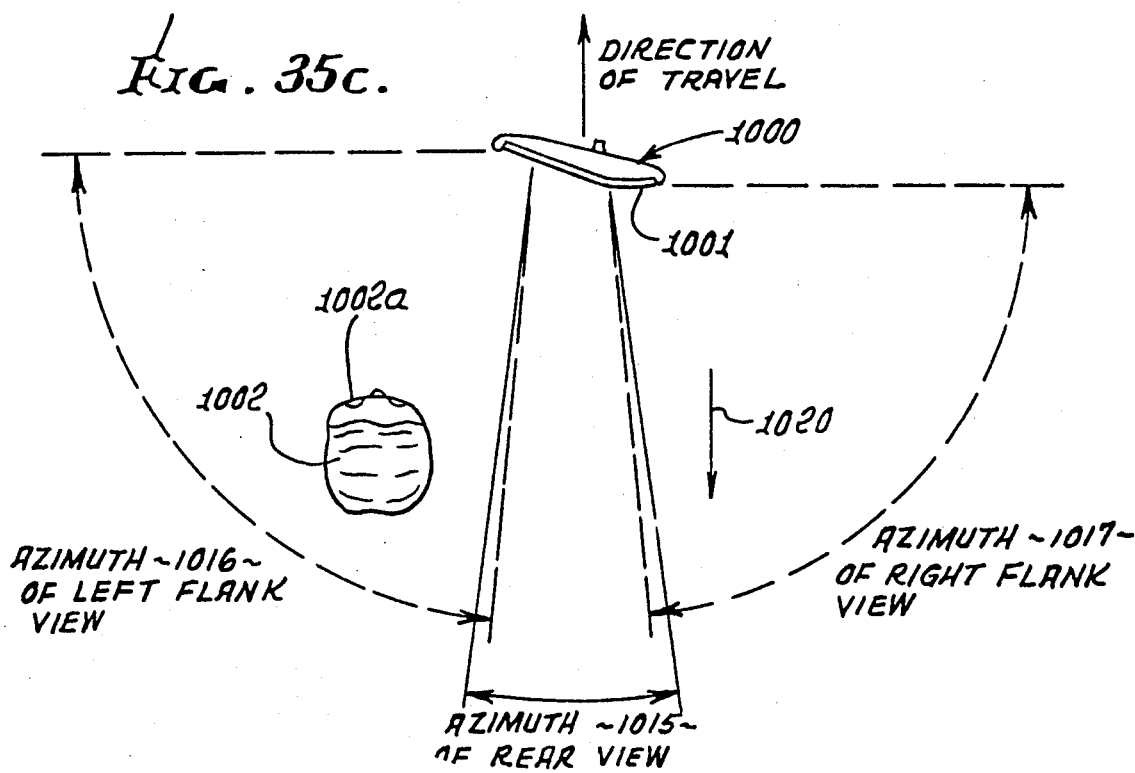

ELIMINATION OF INTERNAL REFLECTIONS AND DIFFRACTIONS FROM JUNCTURES IN AND AT THE PERIPHERY OF, A SEGMENTED MIRROR

BACKGROUND OF THE INVENTION

This application is a continuation-in-part of Ser. No. 385,544, filed June 7, 1982, now U.S. Pat. No. 4,470,665 which is a divisional of Ser. No. 233,106, filed Feb. 10, 1981, now issued U.S. Pat. No. 4,368,951, on Jan. 18, 1983.

This invention relates generally to mirrors comprising a myriad of reflecting surfaces so aligned with respect to each other as to produce one virtual image, which may be plain or focused. More particularly, it concerns mirrors of the type wherein said surfaces are irregular in outline to minimize or prevent glint patterns. Furthermore it relates to lenses comprising a myriad of lense surfaces so aligned with respect to each other as to produce one focused image.

This invention may be used in the construction of rear view mirrors (for automobiles) which afford 160° or greater angle of rear and flank views from a mirror bracket only somewhat wider than a conventional rearview mirror. This mirror will afford an undistorted image through the rear window, and smaller virtual images from the left and right flanks and sides of the vehicle.

Most existing mirrors are continuous reflecting surfaces which may be two-dimensional planar surfaces or three-dimensional curved surfaces (convex, concave or other). Conventional three-dimensional shaped mirrors are bulkier than planar mirrors by virtue of the additional material needed to provide the third-dimension of the mirror surface. Commercially produced three-dimensional mirrors often have relatively large aberrations with attendant distortion of the images reflected therefrom. Reducing such distortions would significantly increase the cost of such mirrors.

In the past, mirrors have been proposed wherein multiple reflecting surfaces, offset from one another, have regular form, as in U.S. Pat. No. 3,739,455 to Alvarez. Due to such repetition of regular outlines of the reflecting surfaces, linear glint patterns may be discerned by the viewer. As a result, that type mirror is not well suited to the special mirror shapes, and uses disclosed herein, as for example rear view mirrors for vehicles enabling panoramic viewing of one or both rear flanks of the vehicle as well as toward the rear thereof, and other devices.

As described in U.S. Pat. No. 4,368,951 to Blom, the reflecting surface of a mirror may be segmented, comprising a myriad of reflecting surfaces so aligned or located with respect to each other to produce, in the eyes of a viewer, a virtual image, which may be plain or focused. As with a conventional mirror, the metallized surface of the segmented mirror may best be located where it is protected, i.e. on the back side of the transparent part of a mirror assembly, away from the viewer. The manufacture of such segmented mirrors may be accomplished by molding a transparent material in a suitable die. The die typically has one flat side opposite the side containing the sectors comprising the segmented mirror.

The main problem with segmented mirrors is that the viewer is bothered by optical interference which originates from the narrow zones separating the individual mirror sectors. Light is transmitted without distortion forward through the flat front of the transparent mirror assembly, and most of the light is reflected without distortion off the metallized sectors at the back of the mirror; however, that portion of the light transmitted to the back of the mirror which impinges on the thin zones separating the mirror sectors is reflected and refracted with uncontrolled geometry. These uncontrolled light eminations back toward the viewer tend to "fuzz" the definition of the virtual image he sees. These aberrations may take the form of linear glint patterns where the sectors of the mirror are in a regular geometric configuration, as in U.S. Pat. No. 3,739,455 to Alvarez. Or the aberration may be more diffuse as in U.S. Pat. No. 4,368,951 to Blom, where the sectors are irregular in outline.

SUMMARY OF THE INVENTION

The main object of this invention is to provide method and means for insuring that a segmented mirror will produce an image free of undesired optic effects related to or resulting from the narrow spaces separating the metallized reflective areas. This is accomplished by coating the back of the molded mirror along the narrow zones between mirror sectors with a light-absorbtive material having an index of refraction, substantially equal to the index of refraction of the transparent molding. Light incident thereon cannot be reflected or refracted back towards the viewer from these zones, because it is transmitted into and absorbed in the coating material. Also the metallizing material may be thinned towards the edge of each reflective area to a mono-molecular feather edge, and covered by the light-absorbtive material of approximately the same index of refraction as the material used to mold the segmented mirror. With this treatment, observable diffractions are precluded from the periphery of each mirrored sector. If the metalizing material would terminate abruptly at the periphery of each sector, this periphery would be a line source of diffractions.

Another object is to apply the metallizing material with diminishing thickness toward the edge of each mirror sector by providing a metal lattice having the same shape and width as the lattice of narrow zones separating the mirror sectors. This lattice is then superimposed on, and collated with the molding onto which the metallizing material is deposited electrostatically. During such deposition the metallizing gas and/or droplets are electrostatically charged with the same polarity as is applied to the metal lattice.

Another object of the invention is to maximize the area of the reflecting sectors and minimize the area of the narrow zones separating the reflecting sectors. In the case of U.S. Pat. No. 4,368,951 to Blom, this entails two actions in making this master die. First, the parallel guide holes formed in the original master block, prior to segmentation thereof, are drilled into the back, inoperative side of the master block, such drilling to be terminated before penetrating the operative surface. Second, the laser beam typically used to cut the original master block into segments is focused to its thinnest dimension at the operative surface, as will be described.

These and other objects and advantages of the invention, as well as the details of illustrative embodiments, will be more fully understood from the following description and drawings, in which:

DRAWING DESCRIPTION

FIGS. 1 through 9 show the sequence of steps for making a segmented mirror, and are separately described as follows:

FIG. 1 is a vertical section through a flat-lying convex glass mirror;

FIG. 2 is a vertical section through a plastic negative casting on the FIG. 1 mold;

FIG. 3 is a vertical section showing laser beam cutting of the negative casting into segments, the source of the laser beam being perpendicular to a flat plate;

FIG. 4 is a section showing translation of the FIG. 3 segments to contact a flat glass surface;

FIG. 5 is a section through a die that includes the FIG. 4 segments (immobilized) opposite a flat surface;

FIG. 6 is a positive casting from the FIG. 5 die;

FIG. 7 is a section through a negative die, constructed by using a positive casting from the FIG. 6 die;

FIG. 8 shows the transparent negative plastic casting resulting from the die in FIG. 7;

FIG. 9 shows the casting of FIG. 8 transparently bonded to a transparent glass plate, with metallized surfaces, i.e., a complete segmented mirror which reflects similarly to a convex mirror. (Actually the angle between incident and reflected light is somewhat larger in FIG. 9 than in FIG. 1 because of the refraction at the front surface of the glass support.

In FIGS. 10, 11, 12 and 13 each diagram of the plan view of segments of castings is the same, because the same pattern of cuts is used each time in the segmentation process. This makes possible the substitution of segments to create one collage of two or more groups of segments. The collage of segments is then used as in FIG. 4.

Figure 10:
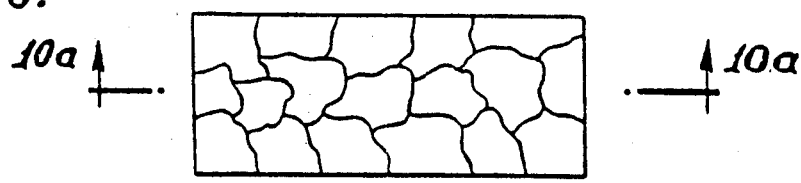
Figure 10A:
Figure 11:
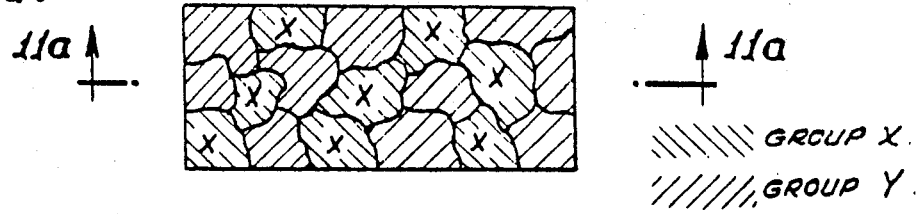
Figure 11A:
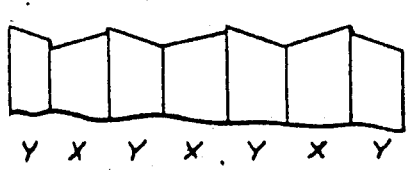
Figure 12:
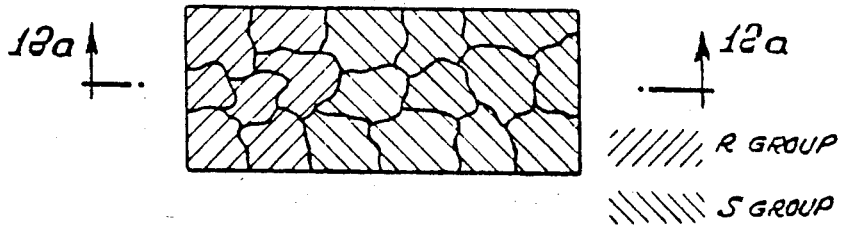
Figure 12A:
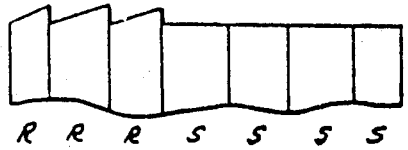
Figure 13:
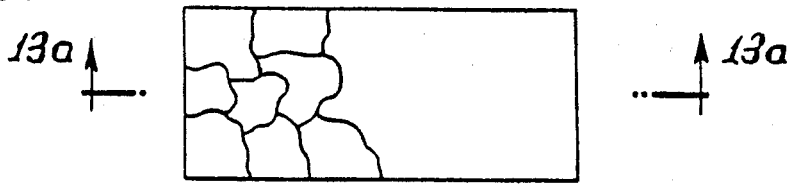
Figure 13A:
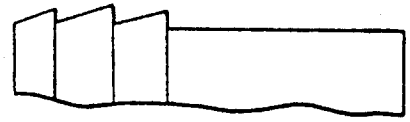
Figure 14:
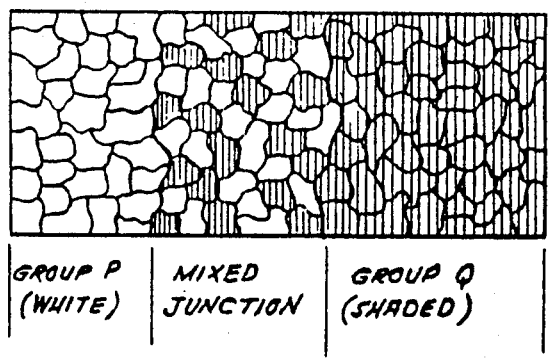
Figure 15A:
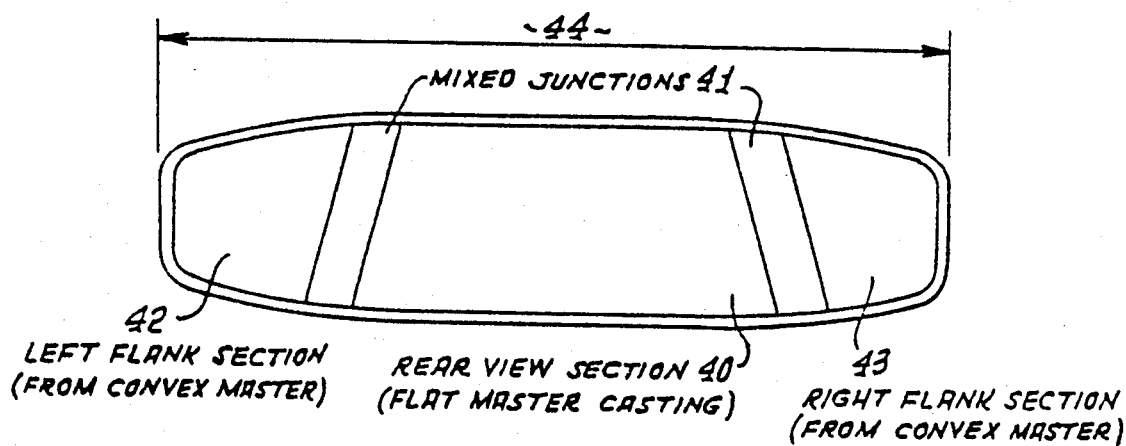
Figure 15B:
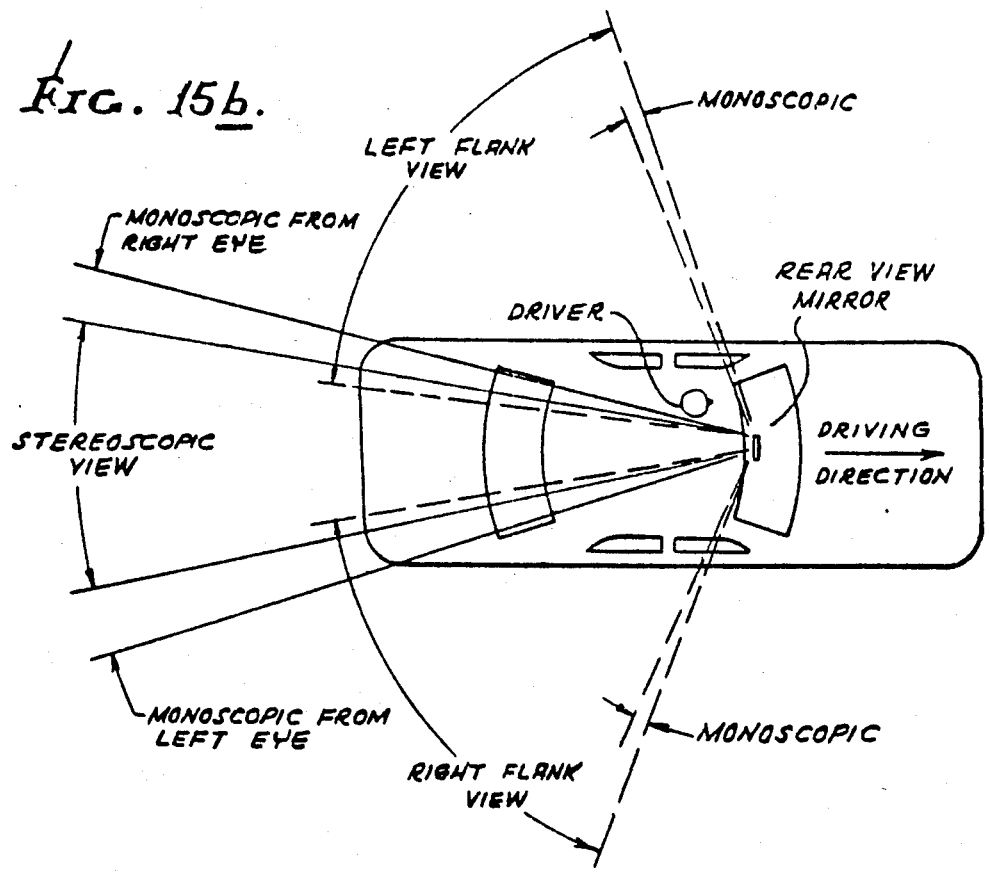
Figure 16A:
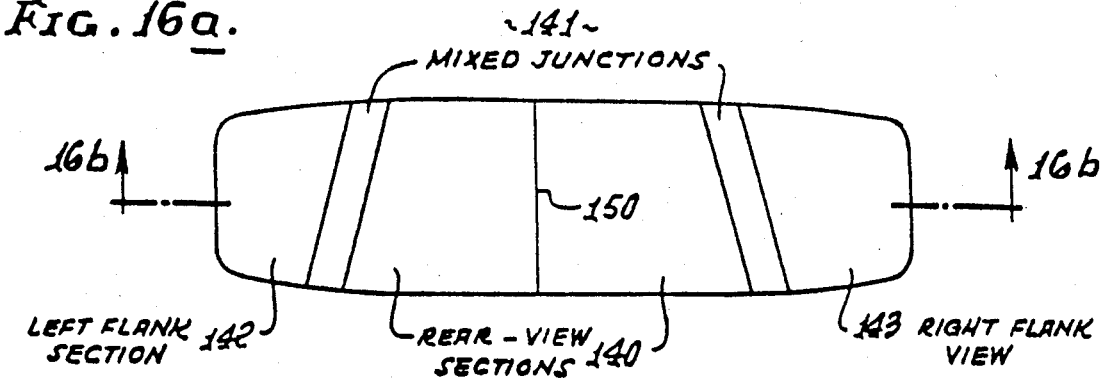
Figure 16B:
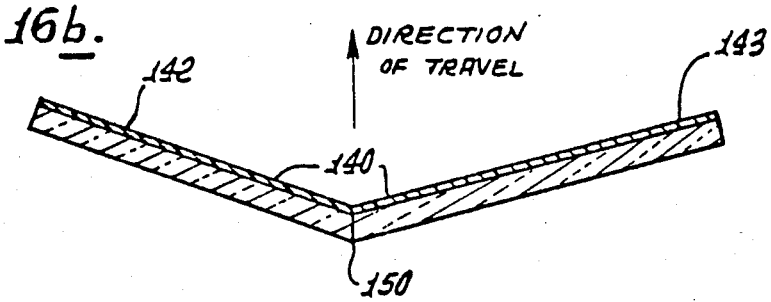
Figure 16C:
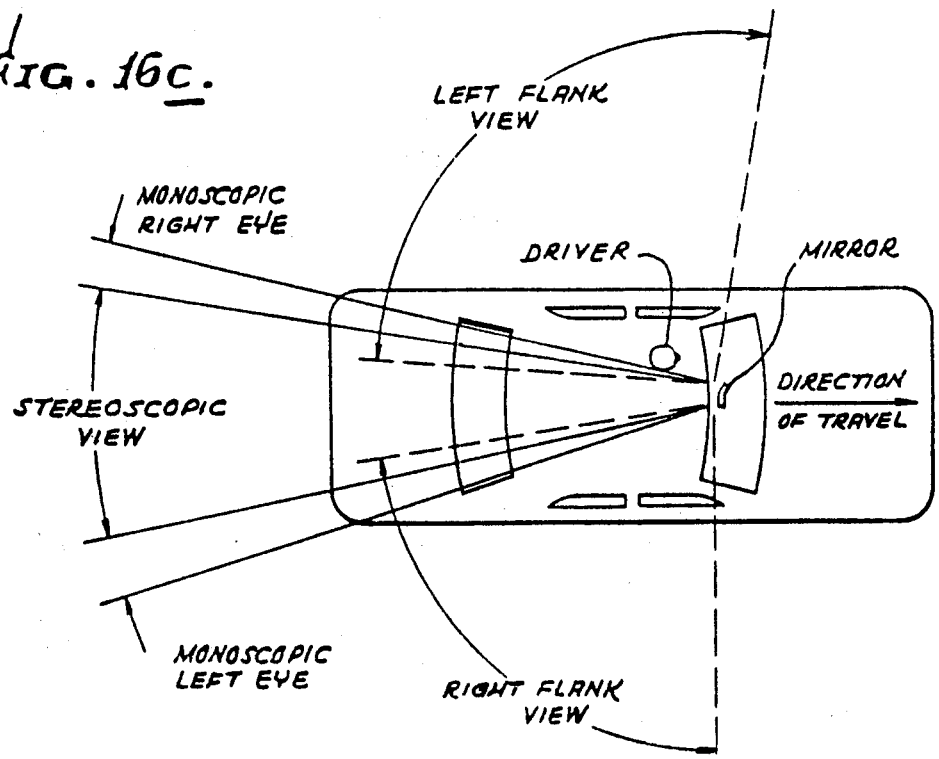

FIG. 10 is a close-up plan view of segments of casting (perpendicular to C-axis);

FIG. 10a is a close-up cross section of displaced facets of segments of negative casting (c.f. FIG. 4);

FIG. 11 is a close-up plan view of segments of castings from two groups of reflection surfaces;

FIG. 11a is a close-up cross section of the facets of segments of castings. Slopes to the left and the X group, and to the right are the Y groups;

FIG. 12 is a close-up plan view of the facets of segments of castings of R and S groups; S group is cast from a flat plate;

FIG. 12a is a close-up cross section of the facets of segments of castings. The R group on the left is in juxtaposition with the S group on the right;

FIG. 13 is a close-up plan view of facets of segments of castings on the left in juxtaposition with a casting from a flat plate, trimmed to fit;

FIG. 13a is a close-up of cross section of the facets of the segments of castings on the left, and a cross section of a casting from a flat plate on the right;

FIG. 14 shows a mixed junction between two groups of segments of castings;

FIG. 15a shows one configuration of a segmented rear view mirror, and FIG. 15b shows in plan the resulting 160° azimuth of rear and flank views;

FIG. 16a shows a driver's view of a mirror comprising two supporting glass plates, rigidly connected;

FIG. 16b is a horizontal cross section of the mirror in FIG. 16a;

FIG. 16c shows in plan the 190° azimuth of rear and side views afforded by using the mirror pictured in FIGS. 16a and 16b;

FIG. 17a is an elevation showing the advantage of tilting the orientation of the support glass, such that the "ghost" reflection from the front of the support glass is from a poorly illuminated area, such as the ceiling of the driver's cab, thereby making it virtually invisible to the driver;

FIG. 17b is a fragmentary section through the FIG. 17a mirror;

FIG. 18 shows a segmented mirror on a three dimensional support, which acts as a flat mirror, and shows the versatility of this invention whereby the shape of the support is independent of the shape of the master mirror from which the segments were derived;

FIG. 19 is a plan view diagram of a conventional rear view from a mirror;

FIG. 20 is an enlarged cross section through a segmented mirror coated in accordance with the invention;

FIG. 20a is like FIG. 20 and shows use of a lattice;

FIG. 20b shows formation of the lattice;

FIGS. 21-24 are perspective close-up showings of the steps to insure accurate displacement of the small segments of a mold (lower block) during their longitudinal translation into positions enabling casting of a mirror media from the bottom surface of the lower block; and enabling mirror media casting, FIG. 25, is a side elevation showing details of guiding and peripheral constriction of irregularly outlined segments of a tabular block from which the lower segmented surface will be used to cast mirror media;

FIGS. 26-28 are not used.

Figure 29A:
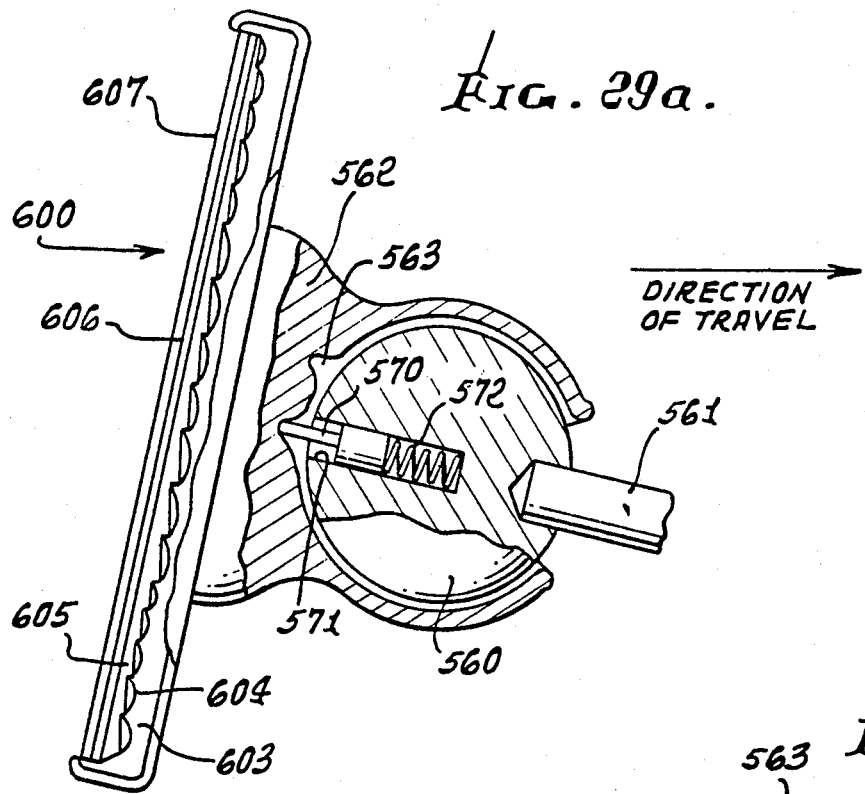
Figure 29B:
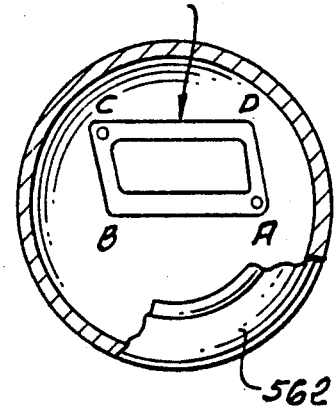
Figure 29C:
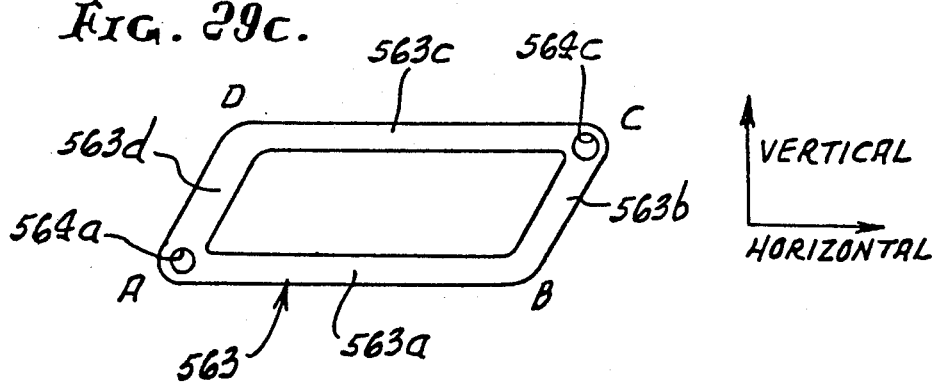

FIG. 29a is a vertical section through a segmented rear view mirror assembly and mounting joint;

FIG. 29b is an elevation showing the concave interior surface of the FIG. 29a ball housing, showing a raceway groove therein;

FIG. 29c is an enlarged view of the raceway groove seen in FIG. 29b;

FIG. 29d is a further enlarged view showing raceway groove variable depth configuration;

Each of the groups of figures FIGS. 30a -c, FIGS. 31a-c, FIGS. 32a-c, FIGS. 33a-c, FIGS. 34a-c, and FIGS. 35a-c shows a segmented mirror configuration (see FIGS. 30a and b, FIGS. 31a and b-FIGS. 35a and b) and the use thereof as a rear view mirror (see FIG. 30c, FIG. 31c-FIG. 35c).

DETAILED DESCRIPTION

Construction of such segmented mirror surfaces is best achieved by forming them from a plastic material, utilizing a die. The plastic material may provide the necessary rigidity, or it may be cast into a thin layer (flat on one side and the segmented surfaces on the other). The flat side of the thin layer is then adhered to a dimensionally stable flat material such as glass. The metallized reflecting surface may be either the air-reflector interface on which the incident light first impinges, or, if all materials are sufficiently transparent, the impinging light may travel through these materials and be reflected by a mirroring material on the "back" side. The latter generally would be preferable to protect the metallized surface, and to facilitate cleaning of the exposed surface.

Figure 7:
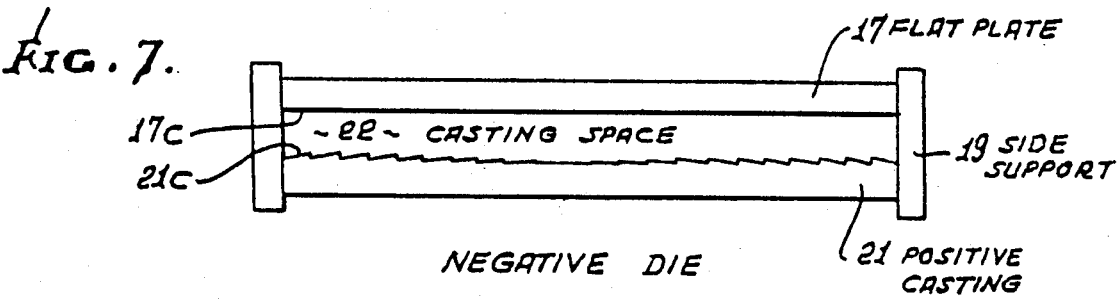

In order to construct a die as seen in FIG. 7, a model as at 10 in FIG. 1 with a continuous surface 11 is constructed in the shaped of the desired reflector. Glass, plastic or some other suitable material may be used for this model, for which a negative copy 12 is molded as in FIG. 2 in some suitable material, such as a thermoplastic. This negative casting 12 is then cut into segments 13 of non-repetitive irregular outline in such a manner that the orientation of the cutting direction (C-axis) is constant and always the same with respect to the negative casting. This common direction, as for example vertical, should be approximately the average direction of viewing of the resulting mirror segments by the driver of the vehicle. One convenient manner of cutting the casting is with a laser beam 14, the laser 14a held in a jig which keeps the beam perpendicular to flat surface 15. See FIG. 3.

After the negative casting is cut into segments, for which perpendicular cross sections are preferably irregular in outline, the segments 13 are translated short distances relative to one another, in the same C-axis direcion which is common to all the cut surfaces. The distance of translation would be such that the surfaces of individual segments 13 of the negative casing each touch the surface to which it is desired that they conform, such as the flat surface 15.

It is essential that the segments of the casting are not rotated around any axis. Their only movement is translation in the direction of the C-axis, and each segment must retain its same contiguous neighbor segments before and after translation. As long as the segments are kept in contact, translation without rotation of the segments is easily and accurately accomplished because the elongate segments have only one degree of freedom of movement with respect to one another, i.e. translation along the C-axis.

The segments are then immobilized with respect to one another, as for example by bonding the segments 13 with backing material 18, at bond locations 16, and the resulting stabilized mosaic of displaced segments of the original reflecting surface may be used to make a positive die FIG. 5 (and subsequently a negative die FIG. 7) for manufacturing replicas of that mosaic surface.

Figure 6:
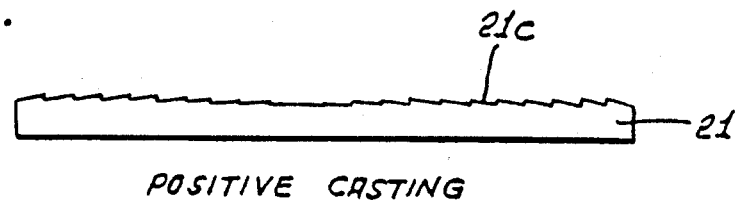
Figure 9:
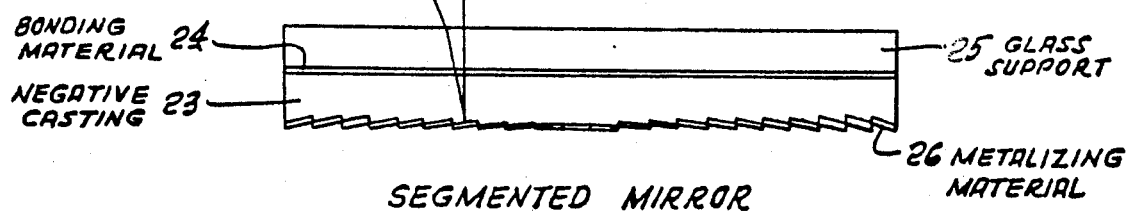

FIGS. 5 and 7 shows dies formed from the FIGS. 4 and 6 structures, and include side supports 19 and a flat cover plate 17. Casting spaces 20 and 22 are thereby formed between plates 17 and surfaces 13c and 21c of mosaics 13 and 21, respectively. FIG. 6 shows a casting 21 made by introduction of plastic into space 20 of FIG. 5, and having corresponding mosaic surface 21c which is a negative image of the surface 13c formed in FIG. 4. The casting 23 may for example consist of transparent plastic material, such as acrylic, opthalmic plastic or other material. Referring to FIG. 9, the casting may be supported on a glass backer 25, and the mosaic surface will be selectively metallized at 26, i.e. only surfaces (corresponding to original segments) of a first group or selected groups will be metallized. The outlines of the segments should be irregular and without parallel straight line segments to obviate the formation of discernible glint patterns. See FIG. 14 in this regard.

VEHICLE MIRROR FOR REAR AND SIDE VIEWS

Conventional rear view flat mirrors afford the driver of a motor vehicle a reflected view of a limited azimuth, restricted by the dimensions of the mirror, of the rear window, and distance of the mirror from the viewer. Such mirrors leave "blind spots" on both rear flanks, which the driver cannot see. This is the cause of traffic accidents when the driver does not properly monitor and take into account the presence of nearby vehicles. Convex mirrors are sometimes substituted for flat mirrors to provide a wider angle of reflected rear view vision, but these mirrors produce small virtual images, and the resolution of the reflected view out the rear window is much inferior to that of the conventional flat mirror. Furthermore, the driver has difficulty in judging distances to objects in the small vitual image. Therefore, drivers sometimes use a convex mirror or mirrors mounted on the sides of vehicles for flank view(s), as well as a conventional flat mirror, thus causing the driver to consult two or more mirror brackets to appraise what is happening near the rear and flanks of his vehicles. Also, there are still "blind spots" despite the several mirrors deployed about the vehicle.

By using the principles of the segmented mirror, as described herein, a new type of mirror is provided which will afford an undistorted "flat" reflected image through the rear window as well as small-scale, "condensed" virtual images of both rear flanks of the vehicle, all within one rigid structural unit not much larger than that used for a conventional rear view mirror.

One problem for a driver attempting to alternate his attention between two or more mirrors (a flat mirror and convex mirror(s) is that he must take the time and conscious effort to redirect the azimuth of his visual attention and he must change the distance at which his eyes are focussed. The focus of his eyes is distant for the flat mirror and close range for the convex mirror(s). As a person becomes older, this becomes more of a problem for many drivers because visual redirection and refocussing takes more time and increased effort. By having all the mirror surfaces within one frame, as enabled by the invention, the driver may glance to the rear view without having to change substantially the distance of focus of his eyes from that which he uses for looking forward through the windshield at the road ahead, while at the same time his peripheral vision can quickly evaluate whether a vehicle is threateningly near either flank of his vehicle. This quick evaluation, without having to refocus to the closer virtual images flanking the undistorted view out the rear window, is possible because the flanking image of a nearby vehicle moving in the same direction will appear as nearly "stationary" whereas the more-distant middleground will appear to be "flying-by" because of the relatively rapid angular velocity of objects along the roadside, when viewed by the driver of a moving vehicle via the mirror. This "stationary" look vs a "flying-by" impression is readily perceived by the peripheral vision and therefore the presence of a nearby vehicle off the flank of the driver's vehicle is easily noted by the driver.

The stereoscopic image one observes with both eyes in a conventional rear view mirror is augmented by monoscopic continuations of the image on either side. The left eye extends the reflected image of distant objects monoscopically to the right by an amount measured horizontally in the plane of the mirror almost as great as the distance between the pupils of the eyes of the observer. Conversely, the same effect occurs with the right eye. The mind combines the central stereoscopic image with the two adjoining monoscopic images into the mental image, comprising the rear view. The observer usually does not realize where the stereo portion of the image terminates, i.e. it all registers as one image to the observer. See FIG. 19 in this regard.

OPTIMUM DESIGN

Rear View Mirror

One optimum design of segmented rear view mirror, to be located inside the vehicle near the center of the windshield will include a central area derived from a planar surface, and two areas (left and right) for viewing the left and right rear flank views. The width of the entire composite mirror is typically about 25 centimeters, and the height about 5.5 centimeters, similar to the dimensions of many conventional planar rear view mirrors. The rear flank views should be derived according to the methods of this invention from areas of master mirrors shaped somewhat like sections from vertically standing barrels. The "barrel shape" should be sufficiently convex along a vertical plane such that the reflected view out the side windows will subtend the entire height of those windows. The cylindrical curvature should be such that the width of each mirror area is about 6 or 8 centimeters for a horizontal azimuth of vision of 60 to 70 degrees.

In order to minimize the width of this mirror, to facilitate the driver's peripheral awareness of the flank views, and to provide a maximum angle of view for each of the three views (rear and both flanks) visible from the composite mirror, mixed junctions as previously described (see FIG. 14) perhaps about 1.5 cm. wide, join the central area 40 with the flanking areas 42 and 43 of this rear view mirror. The mixed junctions 41 may be slanted, as shown in FIG. 15a, to enhance the driver's perception of the last glimpse of a passing vehicle, visible through the lower corner of the rear window in many automobiles.

Another optimum design of a rear view mirror made according to this invention affords an azimuth of view of 190°, more or less. This is accomplished by joining two glass backers, such that they form a chevron-shape in horizontal cross section, with the peak 150 pointed toward the driver, as can be seen in FIGS. 16a, 16b and 16c. When the rear view sections 140 are accurately positioned and immobilized with respect to one another (FIG. 16a), then the user's mind will perceive an unbroken stereoscopic rear view, and the line 150 marking the joining of the two backers will be virtually unnoticed by the driver. The mixed junction 141 correspond to those at 41 in FIG. 15a, and flank sections 142 and 143 correspond to those at 42 and 43 in FIG. 15a.

In the case of a mirror with one glass backer, one would expect that the mirror sector for the view of the left flank should subtend a flanking view somewhat wider than for the right flank, as necessitated by the geometry of the orientation of a conventional rear view mirror to the driver. However, using the principals of mirror-segmentation embodied in this invention, the frame of the composite mirror may be oriented to extend the angle of reflected vision more to the right flask (while commensurately reducing the angle of left flank vision). This has the advantage of minimizing any gap in vision between the junction of the forward peripheral vision and the reflected vision of each flank. See FIG. 15b in this regard.

In some cases and as referred to above, it may prove advantageous to make these junctures mixed rather than abrupt. Mixed junctures in the resultant composite mirror are made by mixing reflecting facets from adjoining families of mirror sectors such that within the zone of mixed juncture both adjoining mirror families will be represented. The concentration or areal density of the number of rear view reflecting sectors of one family may grade from 100% at the edge of that mirror area to 0% at the other edge of the mixed juncture. Concurrently the percentage of sectors resulting from the other "master" mirror would increase from 0 to 100% across the zone of mixed juncture. Or the percentage or representatives of each group throughout the zone of mixed juncture may be constant. See in this regard FIG. 14 will reflecting areas of sets P and Q corresponding to mirror areas 40 and 42, or 40 and 43 in FIG. 15a, and the mixed juncture zone (P and Q) corresponding to mirror area 41.

The mixing of groups of facets within the zone of mixed juncture is accomplished by substitution of appropriate coincident segments of the identically shaped patterns of negative castings of adjoining groups of segments (with common C-axis for all segments). From the resultant collage a single die is made for the entire composite mirror within the bracket.

The advantage of a mixed juncture (as in FIG. 14) in this case is that in the zone of juncture within the area of the composite mirror, images from both the centrally-located flat mirror as well as from the convex mirrors on the left and right sides will be perceived by the driver. The image perceived by the driver of an overtaking automobile will be a "nearly stationary" shape blending from a view seen towards the edge of the rear window to a smaller "nearly stationary" view out the flank window (surrounded by the blurred rush of the background). The mixed juncture will assist the driver's mind to integrate the two views and recognize the continuity of movement of the overtaking auto as it moves from behind to alongside the flank of the driver's vehicle, until the driver's peripheral vision directly "picks up" the overtaking auto by direct view out the side window. Using mixed junctures enables the design of a composite mirror which will take up less horizontal width, thereby affording a more unrestricted view by the driver forwards through the windshield, and enabling easier mental assimilation and recognition of continuity of movement of nearby traffic off both flanks of the vehicle. This is possible because the concurrent views observed by the driver from both flanks are closer together and therefor easier for the mind to perceive by direct and peripheral observation with minimum shifting or refocussing of the driver's eyes.

However, for the purpose of this invention, the juncture zones between the undistorted central portion of the composite mirror and the originally convex flank mirrors may be either smoothly transitional (continuous curvature of one "master" mirror surface, flat in the center and convexly shaped at both ends), abrupt (sudden change from one master mirror surface to another), mixed (as described above), or a combination of these. Each flanking mirror may be junctured so as to minimize the views of the corner posts and driver, in which case the composite mirror might have several, n, families of reflecting facets with n−1 juncture zones.

CONSTRUCTION OF THE MIRROR

The first step in constructing the mirror, an example of which is seen in FIG. 15a is to determine the angular subtendance of rear and side windows from the vantage point of the intended location of the mirror inside the vehicle near the upper central area of the windshield. The central portion 40 of the subject mirror is sized and oriented to afford a complete undistorted view through the rear window. For the left and right flanks, suitable convex mirrors 42 and 43 are designed. These designs should accommodate the transition from reflected views through rear and flanking windows, so the driver easily may "follow" the movement of nearby vehicles traveling in the driver's direction of traffic as they pass from view through rear window to rear flanking windows (or vice versa). The curvatures of the side mirrors 42 and 43 may be designed to make the transition gradual from the undistorted central reflecting area 40 to the convex flank reflectors. Each side mirror may be designed with any convex curvature, including spherical or cylindrical curvature, but more likely a complex convex curvature fashioned to increase the usefullness of the resultant view out the flanking windows.

In order to minimize the width of the "bracket", 44 of the three or more groups of mirror facets, so as to minimize obstruction to the driver's view forward and to facilitate peripheral perception by the driver, the composite mirror system is designed so that the advantages of each of the views are optimized with minimum interference and maximum accomodation to each other. The optimum relative locations of each of the original overlapping "master" mirrors are determined. Castings are made of each master mirror and the castings segmented, in accordance with the principals of this invention with a constant C-axis direction of segmentation common to all "master" mirrors. This C-axis direction must be a constant direction which may be essentially parallel to the line between the point midway between the eyes of an average driver seated in the vehicle, and the central point of the flat mirror (affording a view through the rear window). The pattern of segmentation intended for the finished segmented mirror must be used for segmenting each of the adjoining master castings. Each such adjoining casting of a master mirror must be properly located and oriented with respect to the others such that in the zone of overlap between the sets of segments from adjoining master castings shares identical segments, enabling selection of a boundary, between the two sets of segments with a snug fit between the adjoining sets of segments.

Figure 8:
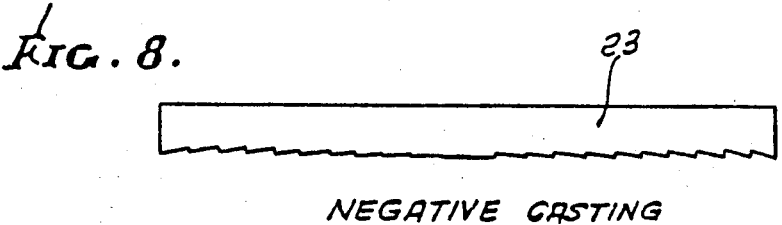

To construct a lens, using the principals of this invention, a special master lens is used, such as in FIG. 1; however, the design of the master lens must be such that the negative casting 23 in FIG. 8 has one focal point for all lens segments. The negative casting 23 is then adhered to the top surface of a flat glass backer, and/or the positive casting 21 of FIG. 6 is adhered to the bottom surface of a flat glass backer to form the lens. The shape of the master lens used for casting a negative die (to control the shape of the "back" surface away from the viewer) must account for the effect of differing indices of refraction on the angles of incidence and emergence of light beams.

In the above description, a casting made from a flat or curved mirror-smooth surface is segmented to form a master die or mold. The segmentation is typically accomplished by cutting the casting into pieces using a laser beam or other device, and then the segments are moved parallel to the unique direction of cutting (C-axis), so that the segments all impinge on a surface of the desired shape, usually a flat plane. This process could involve crowding the segments together so that their parallel surfaces touch. Such touching should insure that the original orientation of a sector of the mirror surface is maintained in the orientation of the corresponding segment. However, if the two sides on the cut are not exactly parallel, when they are pressed together the segments of the casting will not perfectly retain their original orientation, and thus each segment of the cast surface of the mirror will not retain its original orientation vis-a-vis the other segments. In addition, in the process of being crowded together, adjacent segments (cut from convex surfaces) suffer a relative lateral displacement equal to the width of the cut. The resulting mosaic of surfaces, if metallized, would yield a reflection with very minor overlaps in the image around the periphery of each individual surface.

These aforementioned problems may be eliminated in the manner now to be described. Typically, the method involves blocking lateral displacement of the segments while they are translated longitudinally. For example, three or four cylindrical holes or guide openings such as at 201–206 in FIGS. 21 and 22 are drilled (parallel to the C-axis) at locations spaced around the intended peripheries of the individual surfaces or segments before segmenting the original casting. See cuts 207–212.

After the segmentation is complete, a straight rod or hollow tube of circular cross section equal in diameter to that of the hole is inserted between the two remaining walls of each hole. See for example rods 213–215 in FIG. 23. After segmentation by cutting parallel to the C-axis, the segments of the original casting are then translated parallel to the C-axis so that each segment impinges on the surface of desired shape (usually a flat plane as at 216 in FIG. 24). The movement of each segment is confined to the C-axis direction, and there is no "crowding together" of the segments, because they are held apart by the rods or tubes of diameter the same or almost the same as the diameter of openings 201–206.

The described holes are also useful in ensuring accurate setting of the intended angular relationship between the C-axis and the orientation of the surface of desired shape (usually a flat plane), against which each segment of the original casting is made to impinge. This is accomplished by drilling identically located holes in a second rigid sheet or block 230 of material into which a number of rigid guide rods are inserted. See guide rods 231–233 in holes 201, 234 and 235 in mold 236, and extending into holes 201*a*, 234*a* and 235*a* in block 230 in FIG. 24. The lengths of the guide rods extending from the surface of the second sheet or block 230 is such that their ends form a plane 216 of the desired shape and orientation against which the segments are to impinge. First the guide rods 231–233 are inserted into the corresponding holes while rods or tubes 213–215 etc. are inserted in the remaining holes. Then the mosaic of casting-segments are adjusted i.e. translated to the desired plane 216. In this regard, a peripheral constriction typically is applied to the mosaic, immobilizing same, and finally an adhesive material which becomes hard is implaced between the mosaic and the rigid block 230. This forms a rigid block suitable to be surface in a die to be used in accordance with the principals of this invention. See the lateral constriction means 241 and 242 in FIG. 25, the adhesive material 243, in FIG. 25, for example.

From the foregoing, the steps of the method of FIGS. 21–25 include:

(a) cutting irregularly outlined segments of a mold, the segments defining said irregularly outlined surfaces, (b) and longitudinally translating said segments in said common longitudinal direction while blocking lateral displacement of said segments.

In this regard, the step of blocking lateral displacement of the mold segments includes forming longitudinal guide openings in said mold, prior to said cutting step, to intersect the intended peripheries of the irregularly outlined segments of the mold. Further, the blocking step may include inserting longitudinally extending guides into said guide openings, to guide said longitudinal translation of the mold segments. Certain guides (as at 231–233) may be located to block lateral translation of the segments during their translation; and such locating of the guides may include providing a block as at 230 with locating openings therein to receive extensions of the guides.

Pursuant to what has been described above, a segmented mirror may be manufactured by forming a plastic material utilizing a die. The plastic material may provide the necessary rigidity, or it may be cast into a thin layer (flat on one side and the segmented surface on the other). The flat side of the thin layer is then adhered to a dimensionally stable flat material such as glass. By utilizing transparent materials, the metallized reflecting surface may be located on the "back" side of the mirror, away from the viewer, as is usually the case for conventional mirrors. This protects the metallized surface and facilitates cleaning because the exposed surface is flat.

Because the individual mirror sectors of such a molding are aligned with each other, and spaced from one another, in the same relative positions as they would occupy in an unsegmented mirror, reflections from the mirror sections are perceived by a viewer as coming from an unbroken mirror which presents the same image as the image from the mirror which was cut into segments to make the die. However, part of the area of such a segmented mirror comprises the narrow spaces separating the reflective sectors, and the geometry of reflections from these thin areas can not be conformable with the desired reflections. Therefore the viewer will notice a certain "fuzziness" in the desired image, which is reflected collectively from many mirrored sectors, but interferred with by the described incoherent reflections. This problem may be diminished by not metallizing the narrow zones separating the mirror sectors, as suggested above in U.S. Pat. No. 4,368,951 to Blom.

The problem may be substantially or completely eliminated in accordance with the present invention by providing, or applying a coating on or at zones separating the reflection surfaces, the coating material including a light absorber. Referring to FIG. 20, the transparent molded segmented mirror 300 has a transparent molding 301 produced as described above, and with sectors 302. On the latter are a myriad of reflecting surfaces 303a defined as by metallized layers 303 on the sectors at the rear side of the mirror away from the viewer. Such surfaces are located or aligned to produce, in the eyes of the viewer, a virtual image, or separate virtual images from separate portions of the molded mirror (as in FIGS. 15a and 15b). The zones separating the surfaces 303a are shown at 304.

The material coating the zones 304 is shown at 307. That material may be characterized as light absorbing, and typically has the same index of refraction as that of the transparent molding 301. Accordingly, light traversing 302 into zone 304 will be transmitted into the light absorbing material 307 where the light will be absorbed and cannot be reflected back to the viewer. The light absorber may comprise a light absorptive particulate material such as carbon particles, (as from lamp black) dispersed in a carrier such as a mixture of acrylic, opthalmic or other plastic and solvents. The coating thickness is such that light incident thereon from the transport molding is absorbed before it can be reflected back to the transparent molding. See rays 308. Coating 307 may be extended to coat substantially the entire rear side of the mirror including the metallized areas 303.

Another problem arising in the narrow zone 304 of separation is optical diffraction from the edge of the metallized surface. If the metallizing material terminates abruptly along the periphery of a mirrored sector, there will be a line source of diffractions along this sharp periphery. This problem can be eliminated, by thinning or tapering the metallizing layer toward the periphery of each metallized sector, to a "feather edge" of monomolecular thickness, or only partial mono-molecular coverage. See edges 303a'. This gradual thinning of the metallizing material will create increasing transparency to incident light towards this feather edge, and a corresponding gradual reduction in reflectance of light. This gradation of reflection coefficient will eliminate any significant line source of diffractions along the periphery of each mirrored sector. Potential diffractions from this area can be further minimized by coating the back of the zone of thinning metallizing material with the same coating 307 described in the preceeding paragraph, thereby ensuring that incident light can not be reflected from the back of the transparent molding from those minute areas not covered by metallizing material.

Thinning of the metallizing material around the periphery of each mirror sector can be accomplished electrostatically. When metallizing material is applied as a gas or molten droplets as at 313 in FIG. 20a it can be charged oppositely from the molding on which the metallizing material is to be deposited. A lattice, as at 314, patterned after, and superimposed over all the zones of separation in a molding, can be electrically charged the same as the charge on the metallizing material. This process will ensure that the metallizing material will be repelled immediately around the charged lattice, with repulsion decreasing with distance from the lattice, thus causing the thickness of metallizing material to thin to zero at the edge of each mirror sector. The lattice may be cut from a sheet of material with a laser cutter. (See cutter 315 moved along flat surface 330 and lattice 314 cut by beam 315a in FIG. 20b). The material of the lattice should be conductive, (as for example copper) to evenly distribute its electric charge.

The coating applied to the back of the molding, comprising the segmented mirror, should be applied after the metallizing material is deposited thereon. The coating may either be applied only to the narrow zones separating the mirror sectors, or to the entire back of the molding.

To eliminate internal reflections from the edges of the molding, all exterior edges, as at 305, on the sides of the molding should be coated with the same material as used on the back of the molding. See edge coating 307a, which also coats the eges 317a of a glass backer 317 for molding 301.

A molded segmented mirror constructed according to the invention reflects only from the reflective sectors, and not from the narrow zones separating them. To maximize the over-all reflectance of the finished mirror, the areas treated to be non-reflective should be at a minimum. One means of accomplishing this is adapted for mirrors manufactured according to U.S. Pat. No. 4,368,951 to Blom. First, the cylindrical parallel guide holes drilled in the original master block prior to segmentation thereof, are to be drilled from the back, inoperative side of the master block, and drilling is to be terminated before penetrating the block operative surface. These guide holes are identified as holes 201 to 206 in FIGS. 21 through 24 herein and of that patent. This eliminates any optic effect from the guide holes because they do not penetrate the operative or lower surface of block 236, so the holes can be made larger in diameter, and the thickness of the master block may be increased. This allows the holes to be more accurate in dimension, straighter and more truly parallel, all valuable attributes for the purpose of more accurately aligning the segments of the master block to make the die from which the segmented mirrors will be molded. Also, the laser cutter used to cut the original master block into segments is preferably focused to its thinnest dimension at the operative surface, i.e. lower surface of block 236.

Finally, the lattice used to control the distribution of metallizing material should present a target as thin as possible in order that the feather edges of the metallizing material will extend out to the edges of the sectors which act as mirrors.

The mirror construction of FIG. 20 may be used in any segmented mirror, including each of the mirror constructions described above, as in FIGS. 10–14 for example, and also in mirrors with segments of regular outline, such as squares or hexagons, as described in U.S. Pat. No. 3,739,455 by Alvarez.

FIGS. 30a–c to 35a–c illustrates vehicle rear view mirrors each having myriads of reflecting surfaces, as per any of the previously discussed mirrors. Such reflecting surfaces define a plane or planes, and are contained in a mirror assembly or assemblies, which has or have one of the following configurations:

($N_1$) convex rearwardly,
($N_2$) flat rearwardly,
($N_3$) V-shaped with apex facing rearwardly,
($N_4$) flat rearwardly, in two offset sections angled relative to one another, separated by a mirror surface that is free of said myriad of surfaces,
($N_5$) convex rearwardly, in two offset sections separated by a third section which is flat, rearwardly,
($N_6$) flat and convex, rearwardly, in two laterally spaced sections, respectively, which are separated by a mirror surface that is free of said myriad of surfaces.

Thus, FIG. 30a shows a mirror 500 with its face 501 as seen by the viewer, i.e. the vehicle driver whose head and eyes appear at 502 and 502a in FIG. 30c. The mirror frame 523 is suitably supported by strut 524. The myriad of reflecting segments include the family of facets 509 at the center position of the mirror which permit an undisturbed rear view (see azimuth 515 of rear view in FIG. 30c), the family of facets 510 at the left portion of the mirror which permit a condensed view of the left flank of the vehicle (see azimuth 516 of left flank view in FIG. 30c), and the family of facets 511 at the right hand portion of the mirror, which permit a condensed view of the right flank of the vehicle (see azimuth 517 of right flank view in FIG. 30c). The reflecting segments also include metallizing material indicated at 504 on all facets.

Light absorbing material 503 extends as a layer adjacent to the facets at the side thereof further from the viewer. A layer of molded transparent material 505 defines the facets at the side thereof further from the viewer. A transparent glass "backer" appears as layer 507 bonded to the materail 505 via transparent bonding material 506. Incident and reflected light rays appear as shown. The reflected rays as at 508 are directed toward the eyes of the viewer.

Note that the families of facets 509, 510, 511 of the reflecting surfaces 504 each defines a plane, or the mosaic equivalent of a plane, which is convex rearwardly, i.e. in the direction of arrow 520 directed rearwardly. Families of planes 510 and 511 are each more convex than Family 509. Face 501 is also convex rearwardly. Family of facets 509 is so shaped that the driver sees, through the curved backer, an undistorted rear view.

FIGS. 31a–31c are like FIGS. 30a–30c except in this case the family of facets, or the reflecting surfaces, comprising family of facets 609 are parallel, flat surfaces, and the facets in the families of facets 610 and 611 are mosaic-equivalents of surfaces which are convex rearwardly. The overall structure is flat, rearwardly in direction of arrow 620. The elements bear the same numbers as in FIGS. 30a–30c, except that the initial "5" is now a "6." Face 601 is also flat.

Figure 32A:
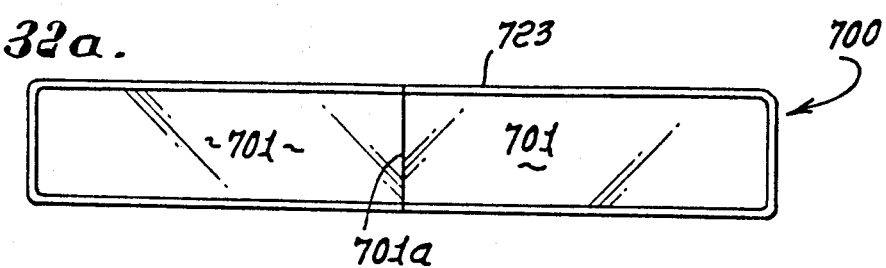
Figure 32B:
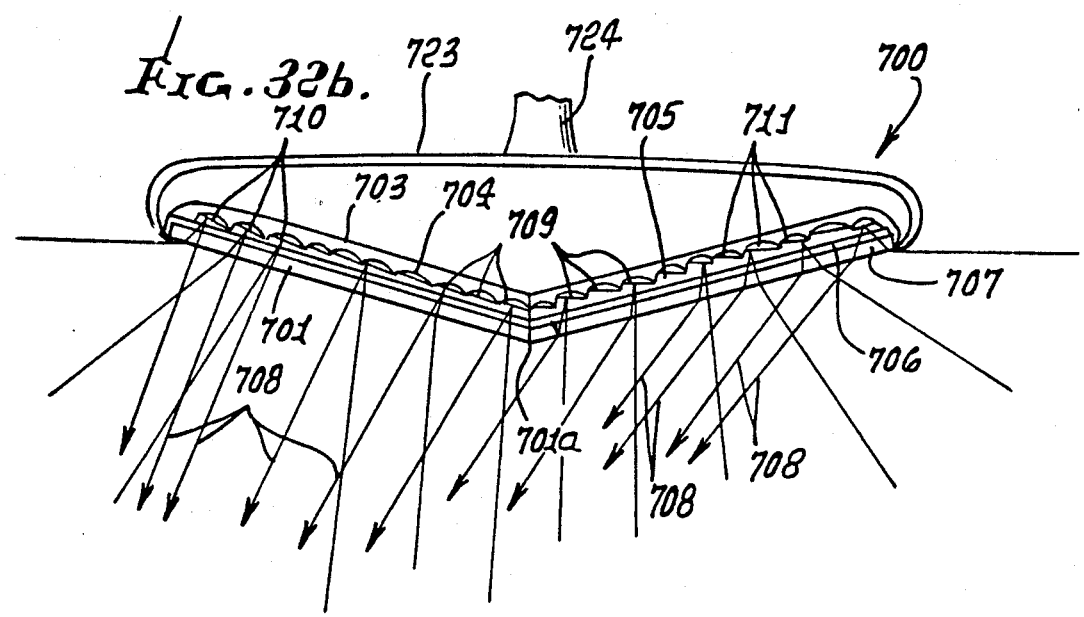
Figure 32C:
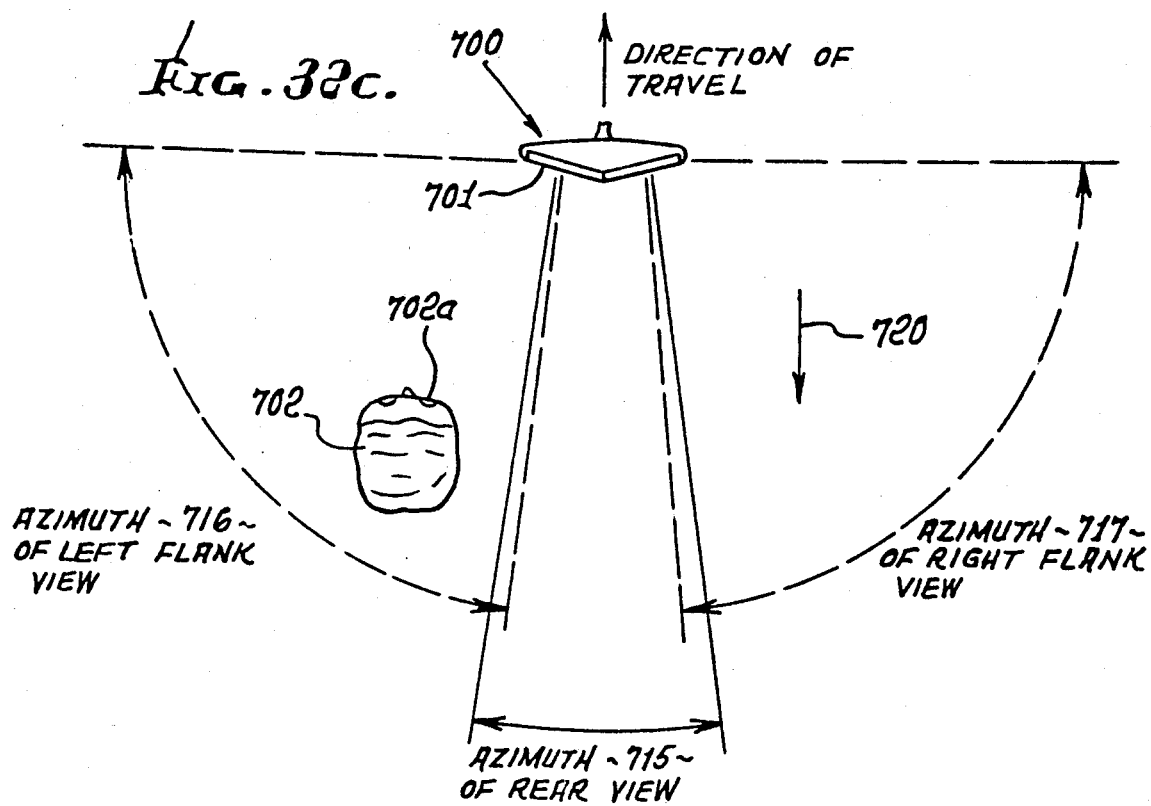

FIGS. 32a–32c are like FIGS. 30a–30c except that the family of facets 709 is divided into two sets of facets, 709 left and 709 right, both of which are sets of parallel, flat surfaces so oriented with respect to each other, that the viewer sees an undistorted rear view without gap or overlap at 701a. Families of facets 710 and 711 each are a mosaic-equivalent to a surface which is convex rearwardly. The overall structure shown has V-shape, rearwardly. The elements are the same as in FIGS. 30a–30c, except that the initial "5" is replaced by an initial "7". The face 701 is also V-shaped, rearwardly, and has an apex at 701a.

FIGS. 33a–33c are again like FIGS. 30a–30c, except that the left and right wings 801a and 801b of the lopsided chevron-shaped bracket 823 meet in a nearly vertical juncture 812, and these wings are flat, rearwardly, with lateral offset surfaces 801a and 801b which meet with angularity α relative to one another. Convex rearwardly families of facets 810 and 811 are separated by a mirror surface 809 that is flat and free of such myriad of reflecting surfaces. Otherwise, the elements are the same as in FIGS. 30a–30c, except that the initial "5" is replaced by an initial "8".

FIGS. 34a–34c are also like FIGS. 30a–30c, except that the family or group of facets 910 and 911, or reflecting surfaces associated therewith, are convex rearwardly, in two laterally offset, left and right sections. Each, in conjunction with refraction of light at the rearward surface of the curved glass backer, comprises the mosaic-equivalent of a surface which is convex rearwardly. Facets in group 909 are flat, rearwardly. Backer face 901 also has two convexities at 901b and 901c separated by flat central region 901a. The mirror elements bear the same numbers as in FIGS. 30a–30c, except that the initial "5" is replaced by a "9".

Finally, FIGS. 35a–35c are like FIGS. 30a–30c except that the left and right groups of facets 1010 and 1011 of mirror 1000, are the mosaic-equivalent of surfaces which are convex rearwardly. They are separated by a mirror surface 1009 that is flat, and free of such myriad of reflecting surfaces. Otherwise, the elements are the same as in FIGS. 30a–30c, except that the initial number "5" is replaced by the initial "10". Backer 1007 is flat over areas 1009 and 1010, and convex rearwardly over area 1011.

Referring now to FIGS. 29a–29d, and also FIGS. 31a–31c, the mirror 600 is supported by a ball and socket swivel, as for example ball 560 on bracket 561 suitably attached to the vehicle windshield. Socket 562 extends part way about the ball, and defines a gap allowing the socket to swivel relative to the ball. A depression of prescribed shape (on for example the socket) defines a detent tract 563, with raceway groove 563a–563d sunk in the socket inner spherical surface, as seen in FIGS. 29b and 29c. The track's deepest depressions 564a and 564c are formed at two racewat corner regions, and a detent follower, as for example pin 570 carried by the ball in bore 571, is urged by spring 572 into the raceway. As the mirror and socket are swiveled, the pin guides in the raceway to control such mirror swiveling, and to locate the mirror in a selected fixed position. There are two such positions shown, corresponding to pin sequential seating in the depressions 564a and 564c. Control knob 580 appears in FIG. 30a.

In FIG. 30c, head 502 is offset from upright plane 530 bisecting mirror 500.

In regard to FIGS. 29 and 30 during night-time use of a segmented mirror in a vehicle, strong headlights of a following vehicle, when reflected from the segmented mirror, may result in a high light intensity bothersome to the driver. Recued reflection intensity from a segmented mirror with a flat backer may be achieved by providing the mechanism as described to quickly change the orientation of the mirror assembly so that the driver sees the view through the rear window reflected from the planar, non-metallized surface of the mirror assembly nearest to the driver.

The planar surface of a segmented mirror assembly, if oriented steeply inclined toward the rear of the vehicle, i.e. upwardly and forwardly, is not parallel to any of the myriad of metallized reflecting surfaces comprising the mirror. With a segmented mirror of this design the driver observes the rear and flank views reflected from the metallized reflecting surfaces, whereas any "ghost reflection" from the rearward surface of the mirror assembly may be minimized by inserting a canopy or shade into the field of the ghost reflection as viewed by the driver as described in my co pending application, "Shade for Segmented Rear View Mirror", incorporated herein by reference. To reduce the reflection of headlights with annoyingly high intensity in the following vehicle, the orientation of the mirror assembly may be quickly changed such that the driver has a low-intensity view out the rear window (but no views of either flank). Such a view results from the reflection off the planar non-metallized front surface of the segmented mirror assembly, when the mirror assembly is oriented in the same manner as a conventional auto mirror. This quick mechanical reorientation of the mirror assembly requires that the steep tilt of the mirror assembly be reversed to tilt very steeply away from the driver, and that the mirror be aligned so that its perpendicular bisects the angle from the driver via the mirror to the rear. In this orientation of the mirror assembly, the driver's view reflected from the metallized mirror surfaces will be directed toward the relative darkness of the front seat. When the driver again wants to see the full rear and flank views, he can quickly readjust the mechanical orientation of the mirror assembly to its original position.

The quick mechanical readjustment of the mirror assembly can be accomplished to provide only two mirror positions in which the mirror assembly is at rest. These two positions correspond to the two orientations 564a and 564c as described above.

The driver of the vehicle may actuate the mechanism for orienting the mirror by pulling knob 680 towards himself. This causes the mirror assembly to move from the initial rest position at 564a. When the pin passes high point B in the runway, the stored energy in compressed spring 572 quickly rotates the mirror assembly about the horizontal axis as the pin snaps the housing 562 toward the rest position 564c. This places the mirror assembly in the proper orientation such that the driver observes low-intensity reflections from planar surface 601. When the driver wishes to return to the original orientation of the mirror assembly, he pushes knob 680 away until the pin has passed high-point D, and then the mirror assembly quickly is rotated about its horizontal axis as the pin snaps back into the intial rest position 564a. The raceway may be Teflon coated; and frame 523 may consist of frangible plastic material for safety.

I claim:

1. In the method of manufacturing a transparent mold segmented mirror having individual sectors on a transparent molding and comprising a myriad of metallized layers providing reflecting adjacent surfaces at the back side of the mirror away from the viewer, and oriented to produce, in the eyes of a viewer, a single virtual image, or separate virtual images from separate portions of such molded mirror, said layers having thinned peripheries, there being a network of zones separating the individual reflecting surfaces, the step that comprises (a) substantially reducing undesirable reflections from said zones of separation by coating the back sides of said zones with material that includes a light absorber,
   (b) the coating carried out to cover zones between reflecting surfaces and the thinned peripheries of said metallized reflecting layers.

2. The method of claim 1 wherein said material has substantially the same index of refraction as the molded material, and said absorber comprises a dispersed, light-absorbtive substance.

3. In method of claim 2 wherein said substance comprises particulate carbon, or lamp black.

4. The method of claim 1 wherein the coating is applied to said zones with thickness characterized in that light incident thereon from the transparent molding is absorbed before it can be reflected back into the transparent molding.

5. The method of claim 1 where the coating is applied to substantially the entire back side of the molding, away from the viewer.

6. The method of one of claims 1–5 where the coating is also applied to edges of the molding.

7. The method of claim 1 wherein a glass backer is provided to adhere to the flat, front, viewer side, of the molded mirror, and including the step of coating the edges of the glass backer with a material of substantially the same index of refraction as the glass backer, and which coating material contains a light absorber.

8. The method of claim 7 wherein said last named light absorber comprises a finely dispersed light absorbing material.

9. The method of claim 8 wherein said last named light absorbing material comprises carbon particulate.

10. In a transparent molded segmented mirror having individual sectors on a transparent molding and comprising a myriad of metallized layers providing reflecting adjacent surfaces at the back side of the mirror away from the viewer, said surfaces oriented to produce, in the eyes of the viewer, one virtual image, or separate virtual images from separate portions of such molded mirror, said layers having thinned peripheries, there being a network of zones separating the individual reflecting surfaces, the improvement comprising:

(a) a material coating the back sides of said zones, and which includes a light absorber, (b) the coating covering zones between reflecting surfaces and the thinned peripheries of said metallized reflecting layers, whereby undesirable reflections from said zones are substantially reduced.

11. The mirror of claim 10 wherein said material has substantially the same index of refraction as the material of said molding, said absorber comprising a dispersed, light-absorbtive substance.

12. The mirror of claim 11 wherein said substance comprise carbon particulate.

13. The mirror of claim 10 wherein said coating has thickness characterized in that light incident thereon from the transparent molding is absorbed before it can be reflected back to the transparent molding.

14. The mirror of claim 10 wherein the coating is applied to substantially the entire back side of the molding, away from the viewer.

15. The mirror of one of claims 10–14 wherein the coating is also applied to edges of the molding.

16. The mirror of claim 10 for use in a vehicle, and having a front, surface, and a holding bracket, the bracket and surface having orientation that is essentially perpendicular to the vehicle's direction of travel.

17. The mirror of claim 10 defining two flat segmented mirror sections, located in one bracket, said sections and brackets oriented to form a chevron pointed generally rearward to enable a rear view subtending more than 180°.

18. The combination of claim 16 including said vehicle mounting the holding bracket so that said front surface is inclined from vertical, being tilted steeply toward the viewer.

19. The mirror of claim 10 wherein the mirror assembly also includes a transparent panel overlying the molding containing said reflecting surfaces and facing the viewer.

20. The mirror of claim 10 wherein said reflecting surfaces form multiple groups of said surfaces, one group located at a central portion of the mirror, and other groups located at left and right portions of the mirror.

21. The mirror of claim 20 wherein said surfaces of said one group are oriented to intercept light rays traveling forwardly from the rear of the vehicle, for reflection toward the viewer, said surfaces of the group at the left portion of the mirror oriented to reflect light rays traveling from the left flank of the vehicle toward the mirror, for reflection toward the viewer, and said surfaces of the group at the right portion of the mirror oriented to reflect light rays traveling from the right flank of the vehicle toward the mirror, for reflection toward the viewer.

22. The mirror of claim 20 wherein said mirror has transparent solid structure extending across and rearwardly of said myriad of surfaces.

23. The mirror of claim 22 wherein said solid structure includes a first molded layer extending adjacent said myriad of surfaces and a second layer overlying said first layer.

* * * * *